United States Patent [19]
Simonoff et al.

[11] Patent Number: 5,944,784
[45] Date of Patent: Aug. 31, 1999

[54] OPERATING METHODS FOR A UNIVERSAL CLIENT DEVICE PERMITTTING A COMPUTER TO RECEIVE AND DISPLAY INFORMATION FROM SEVERAL SPECIAL APPLICATIONS SIMULTANEOUSLY

[75] Inventors: Adam J. Simonoff, Fairfax Station; Robert L. Taft, Dahlgren; Brian T. McLintock, King George; Larry A. Fontenot, Fredericksburg, all of Va.

[73] Assignee: The United States of America as represented by the Secretary of the Navy, Washington, D.C.

[21] Appl. No.: 08/941,544

[22] Filed: Sep. 30, 1997

[51] Int. Cl.$^6$ .................................................. G06F 15/16
[52] U.S. Cl. .......................... 709/203; 709/218; 709/202
[58] Field of Search .................... 395/200.32, 200.33, 395/200.38, 200.39, 200.47, 200.48

[56] References Cited

U.S. PATENT DOCUMENTS

| | | | |
|---|---|---|---|
| 5,386,568 | 1/1995 | Wold et al. | 395/700 |
| 5,544,335 | 8/1996 | Motomura | 395/311 |
| 5,581,558 | 12/1996 | Horney, II et al. | 370/401 |
| 5,590,281 | 12/1996 | Stevems | 395/200.01 |
| 5,754,830 | 5/1998 | Butts et al. . | |
| 5,805,829 | 9/1998 | Cohen et al. | 395/200.32 |
| 5,838,906 | 11/1998 | Doyle et al. | 395/200.32 |

OTHER PUBLICATIONS

Jacobs et al., "Filling HTML Forms Simultaneously: CoWeb–Architecture and Functionality", Fifth International World Wide Web Conference, pp. 1–13, May 1996.

Montague, B.R., "JN: OS for an embedded Java network computer", IEEE Micro, vol. 17 No. 3, pp. 54–60, May 1997.

Ram, P.; Abarbanel, R., "Enterprise computing: the Java factor", Computer, vol. 30 No. 6, pp. 115–117, Jun. 1997.

Kindlund, E., "Navigating the applet–browser divide", IEEE Software, vol. 14 No. 5, pp. 22–25, Sep. 1997.

*Primary Examiner*—Frank J. Asta
*Assistant Examiner*—Almari Romero
*Attorney, Agent, or Firm*—James B. Bechtel, Esq.

[57] ABSTRACT

A Universal Client with a self-contained scripting language called GUIScript allows computing systems of varying architectures linked to the Internet or connected by an Intranet to run the same application software without modification or recompilation. Using a client-server architecture, the Universal Client receives GUIScript from the server, which commands the Universal Client to display certain graphical user interface (GUI) objects. The GUIScript also describes the behavior of the GUI objects presented by the Universal Client, thus providing a personality which defines the client application without changing the Universal Client's software. The Universal Client can also send GUIScript to the server to cause the server to execute commands. A method of operating the computer system using the Universal Client and GUIScript is described.

29 Claims, 21 Drawing Sheets

FIG.1

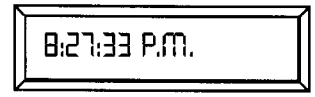

```
<script language="javaScript">
<!-- Hide the script from old browsers-- var timer ID = null;
var timerRunning = false;
var id,pause=0,position=0;

function stopclock (){
            if(timerRunning)
                        clearTimeout(timerID);
            timerRunning = false;
} function showtime () {
            var now = new Date();
            var hours = now.getHours();
            var minutes = now.getMinutes();
            var seconds = now.getSeconds()
            var timeValue = "" + ((hours >12) ? hours -12 :hours)
            timeValue += ((minutes < 10) ? ":0" : ":") + minutes
            timeValue += ((seconds < 10) ? ":0" : ":") + seconds
            timeValue += (hours >= 12) ? "P.M." : "A.M."
            document.clock.face.value = timeValue;
            timerID = setTimeout ("showtime()",1000);
            timerRunning = true;
} function startclock () {
            stopclock();
            showtime();
}
// --End Hiding Here -->
</script>
<body onLoad="startclock()'>
<form name="clock" onSubmit="0">
<input type="text" name="face" size=13 value="">
</form>
```

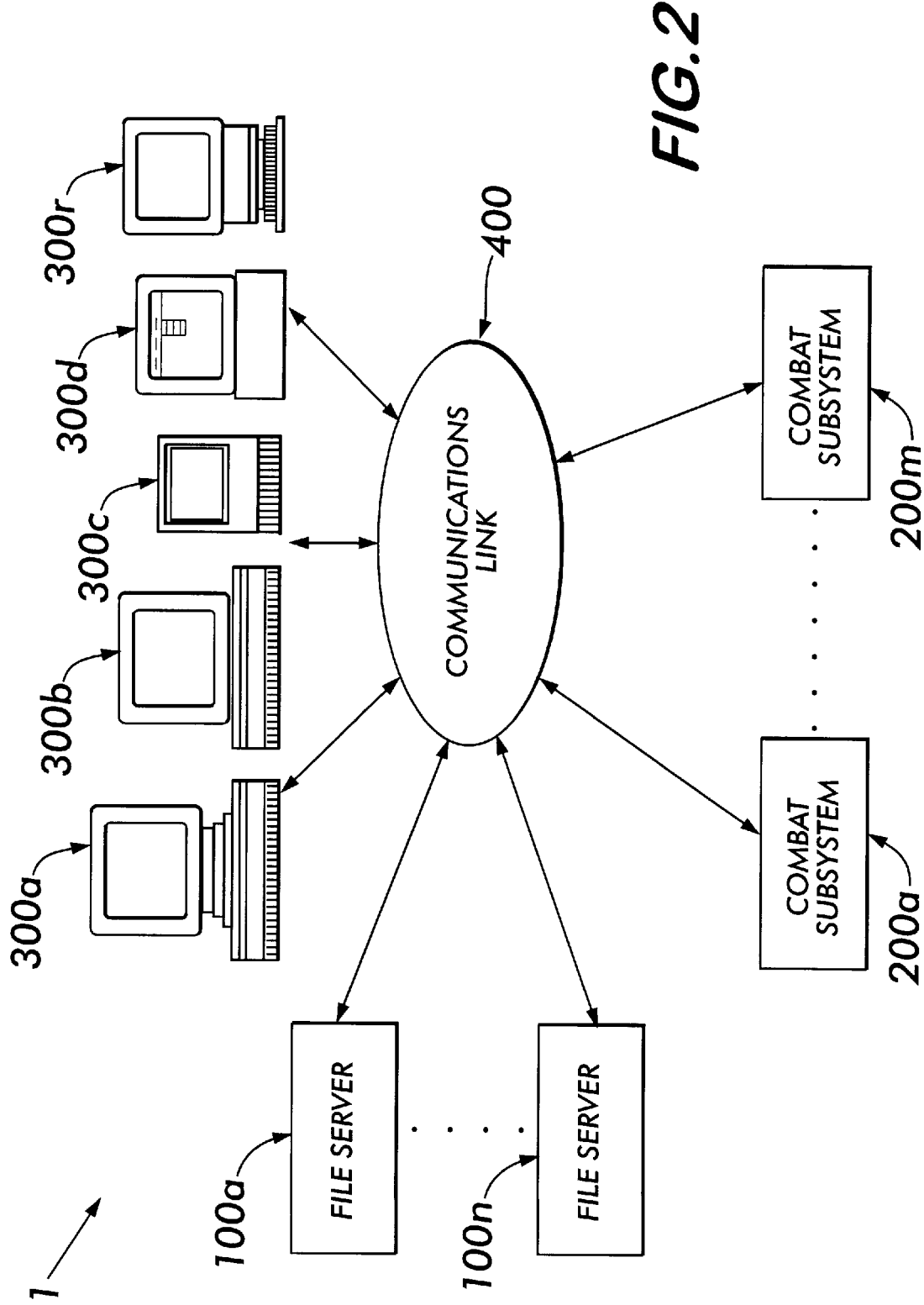

---

GUISCRIPT Syntax Diagram
---

// A COMMENT may appear anywhere except within an ATOM (or the HEADER).
// COMMENTs do NOT nest!
COMMENT ::==
    `/*`ANYTHING`*/`
    // (except `*/`, which would signal the end of the COMMENT)

---

MESSAGE ::== // sent over the "net"
    HEADER GUISCRIPT

GUISCRIPT ::==
    GUISCRIPT_ITEM*

GUISCRIPT_ITEM ::==
    ACTION
    NEW_FRAME
    ( graphics KEY_NAME GRAPHICS_ARG* ) // KEY_NAME is a CanvasPanel? identifier HEADER ::==
    ########
    // these eight one-byte characters are a string-representation of the
    // length of the GUISCRIPT (in bytes).
    //
    // NOTE: We are planning to expand the size of the header to 32 bytes
    //      and give it a different format. The new header will include
    //      a byte of flags, three or four bytes indicating the message
    //      length, four bytes for the sender's "signature, a byte or two
    //      to identify the message "number", and possibly several bytes
    //      for validity (error) checking and an encryption key.

---

LET_COMMAND ::==
    ( let KEY_NAME COMMAND* )

FIG.6A

// Run COMMANDs using KEY_NAME as the target object.
// Each COMMAND must be a legal action for KEY_NAME's class.

NEW_FRAME ::==
    ( newFrame KEY_NAME QUOTED_STRING FRAME_ARG* )

FRAME_ARG ::==
    ADD_COMPONENT
    ( addDialog KEY_NAME QUOTED_STRING BOOLEAN DIALOG_ARG* )
    ADD_MENU
    (addPanel KEY_NAME CONTAINER_ARG* )
    ( setCursor CURSOR )
    ( setResizable BOOLEAN )
    WINDOW_ARG GRAPHICS_ARG ::==
    ( draw KEY_NAME spheric  // KEY_NAME is a region identifier
        RANGE{0:359} RANGE{0:359} // min, max bearing (degrees)
        RANGE{0.0:256.0} RANGE{0.0:256.0} // min, max range (nm)
        RANGE{0:90} RANGE{0:90} // min, max elevation (degrees)
        COLOR
        DRAWSTYLE )
    ( draw KEY_NAME cylindric // KEY_NAME is a region identifier
        RANGE{0:359} RANGE{0:359} // min, max bearing (degrees)
        RANGE{0.0:256.0} RANGE{0.0:256.0} // min, max range (nm)
        RANGE{0.0:} RANGE{0.0:} // min, max height (nm)
        COLOR
        DRAWSTYLE )
    ( erase KEY_NAME )

COLOR ::==
    SYMBOL                        // a legal Java color name
    RANGE{0:255} RANGE{0:255} RANGE{0:255} // red, green, blue DRAWSTYLE ::==
    solid
    wire DIALOG_ARG ::==
    ( setResizable BOOLEAN )
    WINDOW_ARG

CONTAINER_ARG ::==

*FIG.6B*

( addFrame KEY_NAME CONTAINER_ARG* )
( addPanel KEY_NAME CONTAINER_ARG* )
ADD_COMPONENT
( setLayout LAYOUT_MANAGER )
COMPONENT_ARG ADD_COMPONENT ::==
    ( addButton KEY_NAME QUOTED_STRING COMPONENT_ARG* )
    ( addCheckbox KEY_NAME QUOTED_STRING CHECKBOX_ARG* )
    (addLabel   KEY_NAME QUOTED_STRING LABEL_ARG* )
    (addCanvas     KEY_NAME COMPONENT_ARG* )
    ( addCheckboxGroup   KEY_NAME CHECKBOXGROUP_ARG* )
    (addChoice     KEY_NAME `"'TITLES`'" CHOICE_ARG* )
    (addList   KEY_NAME LIST_ARG* )
    ( addMultiState_Button KEY_NAME `"'TITLES`'" CHOICE_ARG* )
    (addSeparator   KEY_NAME SEPARATOR_ARG* )
    ( addTextArea KEY_NAME INTEGER INTEGER TEXTCOMPONENT_ARG* )
    // the two INTEGER fields represent rows and columns
    ( addTextField   KEY_NAME TEXTFIELD_ARG* )
    ( addScrollbar KEY_NAME ORIENTATION SCROLLBAR_ARG* )

CHECKBOX_ARG ::==
    ( setValue BOOLEAN ) // set initial value
    COMPONENT_ARG CHECKBOXGROUP_ARG ::==
    ( addCheckbox KEY_NAME QUOTED_STRING CHECKBOX_ARG* )
    ( setValue KEY_NAME ) // set initially pushed-in radio button

TITLES ::==
    TITLE
    TITLE/TITLES

TITLE ::==
    ANYTHING AT ALL EXCEPT A `'" OR `/'
    " QUOTED_STRINGs (without the quotes) separated by slashes,
    // all enclosed in double-quotes CHOICE_ARG ::==
    ( setValue QUOTED_STRING ) // set initial value

FIG.6C

COMPONENT_ARG

COMPONENT_ARG ::==
    ( disable )
    ( enable )
    ( hide )
    ( move INTEGER INTEGER ) // (x,y) in parent's coord space
    ON_EVENT
    ( reshape INTEGER INTEGER INTEGER INTEGER ) // x,y, width, height
    ( resize INTEGER INTEGER ) // width, height in pixels
    RESIZE_PERCENT
    ( setBackground RANGE{0:255} RANGE{0:255} RANGE{0:255} ) // red green blue
    ( setConstraints CONSTRAINT* ) // no CONSTRAINTs sets constraints to default
    ( setBorderLayoutLocation BORDER_LAYOUT_LOCATION ) // for BorderLayouts
    SET_FONT
    ( setForeground RANGE{0:255} RANGE{0:255} RANGE{0:255} ) // red green blue
    ( setReportable BOOLEAN )
    ( show )
    ( validate )
    ACTION ACTION ::==
    ( print ATOM* ) // prints ATOMs to stdout
    ( sleep INTEGER INTEGER? ) // milliseconds + optional nanoseconds
    ( storeScript SCRIPT* )
    LET_COMMAND
    REPORT
    GET_FILE
    STORE

SCRIPT ::==
    ( KEY_NAME COMMAND* )

LABEL_ARG ::==
    ( setAlignment ALIGNMENT )
    COMPONENT_ARG

LIST_ARG ::==
    ( addItem QUOTED_STRING )
    ( insertItem QUOTED_STRING INTEGER) // INTEGER is position of item in list.
    ( clear )
    ( makeVisible INTEGER ) // position to be made visible
    ( select INTEGER ) // position to be selected

*FIG.6D*

```
( setMultipleSelections BOOLEAN )
COMPONENT_ARG

SCROLLBAR_ARG ::==
    ( setLineIncrement INTEGER )
    ( setPageIncrement INTEGER )
    ( setValue INTEGER )
    ( setValues INTEGER INTEGER INTEGER INTEGER ) // value, visible, min, max
    COMPONENT_ARG STORE ::==
    ( storeScript KEY_NAME ACTION* )
    // Store ACTIONs under KEY_NAME. The ACTIONs are executed when
    // KEY_NAME is invoked as the first (usually only) atom in a COMMAND
    // (e.g., when triggered by an event).

TEXTCOMPONENT_ARG ::==
    ( setEditable BOOLEAN )
    ( setText QUOTED_STRING* )
    COMPONENT_ARG TEXTFIELD_ARG ::==
    ( setEchoCharacter CHARACTER )
    TEXTCOMPONENT_ARG SEPARATOR_ARG ::==
    ( setEtching ETCHING )
    ( setConstraints CONSTRAINT* ) // no CONSTRAINTs sets constraints to default WINDOW_ARG ::==
    ( dispose )
    ( pack )
    ( show )
    ( toBack )
    ( toFront )
    CONTAINER_ARG KEY_NAME ::==
    SYMBOL // an identifier for a component. This symbol MUST
        // BE UNIQUE among all "sibling" components within its
        // parent container. A globally_unique identifier for
```

*FIG.6E*

// this component is constructed by appending its
// KEY_NAME to that of its parent, with the two symbols
// separated by a greater-than (>) character. Thus for
// a omponent in a nested hierarchy, its global key might
// be SomeFrame>SomePanel>SomeCheckboxGroup>SomeCheckbox

ATOM ::==
    QUOTED_STRING
    NUMBER
    SYMBOL

QUOTED_STRING ::==
    "ANYTHING AT ALL EXCEPT A DOUBLE-QUOTE"

NUMBER ::==
    FLOAT
    INTEGER
    RANGE{NUMBER:NUMBER} // min:max allowed values for RANGE
    RANGE{NUMBER:} // min allowed value for RANGE
    RANGE{:NUMBER} // max allowed value for RANGE SYMBOL ::==
    // an unquoted string containing any characters except
    // " () `/*' `*/' and whitespace BOOLEAN ::==
    true
    false ON_EVENT ::==
    ( onEvent EVENT_ID ACTION* )

EVENT_ID ::==    // not all EVENT_IDs are triggered by all components
    'ACTION_EVENT'
    'CHECKBOX_OFF'
    'CHECKBOX_ON'
    'GOT_FOCUS'
    'KEY_ACTION'
    'KEY_ACTION_RELEASE'
    'KEY_PRESS'
    'KEY_RELEASE'

*FIG.6F*

'LIST_DESELECT'
'LIST_SELECT'
'LOAD_FILE'
'LOST_FOCUS'
'MOUSE_DOWN'
'MOUSE_DRAG'
'MOUSE_ENTER'
'MOUSE_EXIT'
'MOUSE_MOVE'
'MOUSE_UP'
'SAVE_FILE'
'SCROLL_ABSOLUTE'
'SCROLL_LINE_DOWN'
'SCROLL_LINE_UP'
'SCROLL_PAGE_DOWN'
'SCROLL_PAGE_UP'
'WINDOW_DEICONIFY'
'WINDOW_DESTROY'
'WINDOW_EXPOSE'
'WINDOW_ICONIFY'
'WINDOW_MOVED'

COMMAND ::==
    // A COMMAND is an action-name, optionally followed by arguments,
    // in a format described in this document, all surrounded by ().
    // The COMMAND is performed upon the local (enclosing) object.

RESIZE_PERCENT ::==
    ( resizePercent RANGE{0:100} RANGE{0:100} )
    // width, height as a percent of container size

ETCHING ::==
    'OUT'
    'IN'

CONSTRAINT ::==
    ( anchor ANCHOR_VALUE )
    ( fill FILL_VALUE )
    INSETS
    ( GRID INTEGER )
    ( GRID 'RELATIVE' )
    ( GRID 'REMAINDER' )
    ( IPAD INTEGER )

FIG.6G

( WEIGHT FLOAT )

ANCHOR_VALUE ::==
    'CENTER'
    'NORTH'
    'NORTHEAST'
    'EAST'
    'SOUTHEAST'
    'SOUTH'
    'SOUTHWEST'
    'WEST'
    'NORTHWEST'

ORIENTATION ::==
    'HORIZONTAL'
    'VERTICAL'

FILL_VALUE ::==
    'NONE'
    'BOTH'
    ORIENTATION

GRID ::==
    gridx
    gridy
    gridwidth
    gridheight

IPAD ::==
    ipadx
    ipady

WEIGHT ::==
    weightx
    weighty

SET_FONT ::==
    ( setFont SYMBOL STYLE INTEGER ) // SYMBOL is the font's name
    // INTEGER is the point size

STYLE ::==
    'BOLD'
    'ITALIC'

*FIG.6H*

'PLAIN'

GET_FILE ::==
    ( getFile SYMBOL* )
    // treats each SYMBOL as a file name and reads 'em in LAYOUT_MANAGER ::==
    GridBagLayout
    XYLayout
    BorderLayout ADD_MENU ::==
    ( addMenu KEY_NAME QUOTED_STRING ACTION* )

MENU_ITEM ::==
    ADD_MENU
    ( addMenuItem KEY_NAME QUOTED_STRING ACTION* )
    ( addMenuItemSeparator KEY_NAME )
    (addCheckboxMenuItem KEY_NAME QUOTED_STRING CHECKBOX_ACTION*)

CHECKBOX_ACTION ::==
    ( 'CHECKBOX_OFF' ACTION* )
    ( 'CHECKBOX_ON' ACTION* )

CURSOR ::==
    'CROSSHAIR_CURSOR'
    'DEFAULT_CURSOR'
    'E_RESIZE_CURSOR'
    'HAND_CURSOR'
    'MOVE_CURSOR'
    'N_RESIZE_CURSOR'
    'NE_RESIZE_CURSOR'
    'NW_RESIZE_CURSOR'
    'S_RESIZE_CURSOR'
    'SE_RESIZE_CURSOR'
    'SW_RESIZE_CURSOR'
    'TEXT_CURSOR'
    'W_RESIZE_CURSOR'
    'WAIT_CURSOR'

ALIGNMENT ::==
    'CENTER'
    'LEFT'

*FIG. 6I*

'RIGHT'

BORDER_LAYOUT_LOCATION ::==
    North
    South
    East
    West
    Center

*FIG.6J*

```
guiscript
(newFrame mainFrame 'UNCLASSIFIED GUIScripted Chat Room'
    (setLayout GridBagLayout)
    (setBackground gray)
    (addScrollerPanel Scroller
        (setConstraints (gridwidth 127)
                (gridheight 127)
                    (gridx 1)
                    (gridy 1))
        (setBackground gray)
        (setLayout XYLayout)
        (addPanel TitlePanel
            (setConstraints (gridx 1)
                    (gridy 10))
            (setBackground gray)
            (setLayout FlowLayout)
            (addLabel title '*** Chat Room ***'
                (setFont 'Helvetica" BOLD 20)
            )
        )

(addPanel UserPanel
            (setConstraints (gridx 1)(gridy 20))
            (setBackground gray)
            (setLayout FlowLayout)
            (addLabel Name 'User Name'
                (setFont 'Helvetica' BOLD 18)
            )
            (addTextField UserName
                (setEditable true)
                (setFont 'Helvetica' BOLD 18)
                (setText '                    ')
            )
        )

(addTextArea ChatToSend 10 40
            (setEditable true)
            (setFont 'Helvetica" BOLD 18)
            (setConstraints (gridx 1)
                    (gridy 30)
                        (fill HORIZONTAL))
        )
```

*FIG.8A*

```
(addPanel ButtonPanel
   (setConstraints (gridx 1)(gridy 40))
   (setBackground blue)
   (setLayout FlowLayout)

(addButton SendButton 'Send'
      (setFont 'Helvetica' BOLD 18)
         (setBackground gray)
      (onEvent ACTION_EVENT
         (send 'createFile' chat.log)
         (send 'writeFile' {getValue mainFrame>Scroller>UserPanel>UserName}':
'{getValue mainFrame>Scroller>ChatToSend})
         (send 'closeFile' {getValue mainFrame>Scroller>UserPanel>UserName}':
'{getValue mainFrame>Scroller>ChatToSend})
         (send 'broadcast' {getValue mainFrame>Scroller>UserPanel>UserName}':
'{getValue mainFrame>Scroller>ChatToSend})
         )
      )

(addButton ClearButton 'Clear'
      (setFont 'Helvetica' BOLD 18)
         (setBackground gray)
      (onEvent ACTION_EVENT (let mainFrame>Scroller>ChatToSend(clear)))
      )

(addButton CloseButton 'Close'
      (setFont 'Helvetica' BOLD 18)
         (setBackground gray)
      (onEvent ACTION_EVENT (let mainFrame (hide)))
      )
   )

(addTextArea ChatMsgs 10 40
      (setEditable false)
      (setFont 'Helvetica' BOLD 18)
      (setConstraints (gridx 1)
                      (gridy 50)
            (fill HORIZONTAL))
      )

)
  (pack)
)
```

*FIG.8B*

```
(onReceipt broadcast
   (let mainFrame>Scroller>ChatMsgs
      (appendText {getValue broadcast})
      (appendText '\n')
   )
)

(let loadingLabel (hide))
(let StartIDEA (enable true))
```

*FIG.8C*

```
/* $Id: DeltaTimer.java,v 1.1 1997/01/22 16:20:25 tmclint Exp $ */
import java.io.*;

/************************************************************************
**
** class DeltaTimer-
**
** a class for timing code execution BETWEEN mark() calls
**
************************************************************************/
public final class DeltaTimer extends Timer
{
  public DeltaTimer()
  {
    super();
  } public void mark()
  {
    super.mark();
    starttime = System.currentTimeMillis();
  } public static void main(String[] args)
  {
    DeltaTimer t1 = new DeltaTimer();

for (long i = 0; i < 200000; i++);
    t1.mark();
    System.out.println(t1.elapsed());
    for (long i = 0; i < 200000; i++);
    t1.mark();
    System.out.println(t1);
    for (long i = 0; i < 200000; i++);
    t1.mark();
    System.out.println(t1);

//    for (long i = 0; i < 22000000; i++);
//    t1.mark();
//    System.out.println("time: " + t1);
  }
} //   end class DeltaTimer
```

*FIG.9*

OPERATING METHODS FOR A UNIVERSAL CLIENT DEVICE PERMITTTING A COMPUTER TO RECEIVE AND DISPLAY INFORMATION FROM SEVERAL SPECIAL APPLICATIONS SIMULTANEOUSLY

STATEMENT OF GOVERNMENT INTEREST

The invention described herein was made in the performance of official duties by employees of the Department of the Navy and, thus, the invention disclosed herein may be manufactured, used, licensed by or for the Government for governmental purposes without the payment of any royalties thereon.

BACKGROUND OF THE INVENTION

The present invention relates to the field of distributed computer systems. More specifically, the present invention relates to a virtual machine or device that facilitates interoperability between two or more computers included in the computer system. According to one aspect of the present invention, a pair of software devices enables two or more dissimilar computers to run the same exact software program without modification or recompilation of the software program. More specifically, methods for cooperatively operating the computers of the computer system and for communicating between the computers of the computer system are disclosed.

Several services within the U.S. Military often need to interoperate, i.e., interact and communicate, with one another to carry out Joint Missions. More specifically, the participants in a Joint Mission must be able to share information including text data, images, and, more importantly, various computer generated displays of consolidated tactical information.

It will be appreciated that the various components of the U.S. Military use a heterogeneous collection of computers running a wide variety of operating systems, e.g., MS-DOS, Windows 3.1, Windows-95, Windows-NT, O/S-2, Macintosh O/S, and several versions of UNIX. The number of different systems which must be interconnected varies with each Joint Mission, making it extremely difficult for the components of the U.S. Military to interoperate. In particular, it is extremely difficult for the various military components to share a homogeneous view of tactical information. The degree of difficulty is often increased when the various military components are physically separated from one another over long distances. Although communication channels are available to interconnect the various computers, wide geographic separation generally dictates the use of a narrow band communications link.

Military components can share text data, maps and/or photographs used in conveying tactical data, after a fashion, even when using dissimilar computers. For example, map data may be displayed using a particular computer program, assuming that a version of the particular computer program tailored to run on each variation of the individual computers forming a computer system is available. It should be mentioned, however, that each branch of the service often uses branch-specific symbols in displaying information; the Army may designate ground troops using one symbol while the naval vessels providing fire support may use a completely different symbol to represent the identical ground troops. Moreover, the U.S. Military is often required to expend manpower and funds to generate a computer program for each variation of computer used in the Joint Mission.

It will be appreciated that the foregoing discussion assumes that several versions of the same program can be installed on the various computers being networked to one another; the problem is exacerbated when the computer systems which must be networked are running incompatible operating systems. For example, the Joint Mission parameters often dictate that a UNIX computer acting as a server, i.e., the computer providing data, be interconnected to various desktop computer and workstation clients, i.e., the computers receiving the data, which clients are running several other incompatible operating systems.

The advent of the Internet, and particularly the World Wide Web (the Web), has provided at least two technical advances which promise to preserve the investment made by large computer operators such as the U.S. Military in hardware, software and training. In particular, these two technical advances provide techniques for distributing applications, or pseudo-applications within hypertext markup language (HTML) documents sent by the server to at least one client over the public Internet or a private Intranet. The latter case will be discussed first.

It is now possible for servers to provide clients with HTML documents having expanded capabilities by virtue of their use of a scripting language such as JavaScript, i.e., a limited programming language designed to extend the capabilities of another application. For example, the numerical clock illustrated in FIG. 1 was generated by the JavaScript routine also illustrated in FIG. 1. The JavaScript routine is downloaded to a client running an appropriate JavaScript Interpreter, which causes the client computer to display, by way of another example, an order form (not shown) in the downloaded Web page. It will be appreciated that the data generated using the JavaScript form is transferred to a common gateway interface (CGI) program in the conventional manner.

Alternatively, the server may provide clients with JAVA™ applications (Applets) embedded into the HTML document. It will be appreciated that a JAVA™ Applet is a small program which can be run automatically as soon as the associated HTML document is transferred from the server to the client(s); several JAVA™ Applets may be transferred to a client within a single HTML document.

It should be mentioned that JAVA™ Applets are compiled applications just as word processing programs are compiled applications. The programmer generates the needed JAVA™ program and then compiles the program using a dedicated JAVA™ Compiler. Errors in the program code will require debugging, as in any compiled program. Once the program has been compiled, the program is stored on the server and a corresponding tag is inserted into the HTML document which will eventually be used to transfer the JAVA™ Applet from the server to the client(s). After the HTML document is transferred, the JAVA™ Applet is invoked and starts to run on a JAVA™ Virtual Machine associated with a JAVA™-enabled Web browser on the client(s).

Thus, current technology is moving away from fat clients, i.e., full programs, to thin clients, i.e., JAVA™ Applets. The principal advantage to the latter approach is in program configuration control, i.e., just the server side program is updated; the client automatically receives the latest version, for example, of the JAVA™ Applet when the associated HTML document is transferred to the client(s). However, the programmer must still develop one or more new JAVA™ Applets for each server application being run. Thus, for a server storing several different databases needed during a Joint Mission, the programmer must write at least one JAVA™ Applet so that the client(s) can effectively interface with each database. Moreover, when the data is not simple alphanumeric data, it may be necessary for the programmer to develop specific versions of the JAVA™ Applets for each command, each service branch, etc., so that branch-specific symbology can be displayed.

In short, an unacceptable amount of time and money is still required to ensure interoperability between the participants of the Joint Mission, even after moving from the fat client approach to the thin client approach to facilitate configuration control. Although one could rely solely on JavaScript for simple data presentation applications, the capabilities of JavaScript would quickly be exhausted. While the JavaScript-enhanced Web pages save programming time over the programming of JAVA™ Applets, principally because JavaScript-extended HTML documents do not require repeated compilation and debugging, the number of serious applications which can be performed solely by means of a JavaScript-extended HTML document is severely limited. Thus, JAVA™ applets and JavaScript-extended HTML documents occupy two different ends of the spectrum of GUI presentation options. JAVA™ applets must be compiled for each platform and, thus, do not provide an avenue to significant cost savings while permitting decreased development time. JavaScript-extended HTML documents, while eliminating compilation time and the shortening development cycle, are incapable of providing versatile GUIs for presenting complex information to a wide variety of diverse computers.

What is needed is a computer network or system wherein various miliary components can use the same computer program and share information beyond the visualization of a map, text or photograph regardless of variations in the individual components of the system. Moreover, what is needed is a practical device which enables each military component to quickly and easily personalize the client, i.e., user, front end, which front end presents graphical user interface (GUI) objects to the user, without the need to modify the same software program application used by all of the other military components connected to the same network. In short, what is needed is a computer system and corresponding method of operation wherein the Government achieves military component interoperability and cost savings irrespective of computer variation and architecture.

SUMMARY OF THE INVENTION

Based on the above and foregoing, it can be appreciated that there presently exists a need in the art for a computer system and corresponding operating method which overcomes the above-described deficiencies. The present invention was motivated by a desire to overcome the drawbacks and shortcomings of the presently available technology, and thereby fulfill this need in the art.

One object according to the present invention is to provide a computer system for interconnecting various military components efficiently. According to one aspect of the present invention, the computer system advantageously permits miliary components to use the same computer program and share information beyond the visualization of a map, text or photograph regardless of variations in hardware and software between the networked computers. According to another aspect of the invention, a dedicated scripting language enables each military component to quickly and easily personalize the user front end, which presents the GUI objects, without modifying the same software program application used by all networked military components. Thus, the Government simultaneously achieves military component interoperability and cost savings regardless of computer variation and architecture.

Another object according to the present invention is to provide a computer system whereby research scientists designing systems employing simulation-based design technology are permitted to run simulations and visualize the results regardless of computer variation. According to one aspect of the present invention, the computer system according to the present invention beneficially permits geographically dispersed users to access a central database, to run simulations, and to receive simulation results. According to yet another aspect of the present invention, the received simulation s results advantageously are displayed as directed by the user.

Still another object of the present invention is to provide a device which advantageously enables application programmers to quickly and easily script application program behavior without requiring modification to the device.

Yet another object of the present invention is to provide an interface development method which advantageously enables application programmers to quickly and easily script application program behavior without requiring concurrent modification to the application program.

Therefore, one object of the present invention is to provide a computer system whereby computer users are able to interoperate with one another irrespective of any variation between the individual computers forming the computer system.

Another object of the present invention is to provide a computer system whereby computer users are permitted to interoperate with one another using a single computer software application program. According to one aspect of the present invention, the single computer program advantageously can be operated by all users substantially unchanged, i.e., without modification or recompilation.

Yet another object of the present invention is to provide a computer system formed from relatively incompatible components which is capable of presenting shared information to all users regardless of vehicle or platform.

Moreover, another object of the present invention is to provide a computer system permitting computer users to interoperate regardless of their geographic location.

Another object of the present invention is to provide a computer running a dedicated computer program wherein the behavior of the computer program can be modified responsive to a program-specific scripting language.

Additionally, it is an object of the present invention to provide a method for recycling computer software. It will be appreciated that this aspect of the present invention was motivated by a desire to save money on, i.e., minimize, software expenditures. Thus, the same software, e.g., software module, can be used repeatedly even though the GUI varies over several generations; changing the GUIScript changes the GUI presented to the operator.

Furthermore, another object of the present invention is to provide a method for creating user front end graphical user interfaces (GUIs) suitable for networked database applications.

Still another object of the present invention is to provide a method suitable for creating user front end GUIs to facilitate networked classroom training. According to one aspect of the present invention, one of the objects included in the GUI advantageously can be a player for displaying video information, which information can be either live, i.e., a real time video display, or prerecorded. According to another aspect of the present invention, the GUI advantageously is capable of displaying several objects simultaneously; a MultiMedia object can be displayed while an associated page of a service manual is retrieved and displayed in a text window. According to yet another aspect of the present invention, the GUI advantageously can be used to control the browser directly.

Yet another object of the present invention is to provide a method suitable for creating user front end GUIs to facilitate interaction between two or more clients via a server. According to one aspect of the present invention, the degree of interaction between the servers can be predetermined using GUIScript.

A still further object of the present invention is to provide a computer system for displaying GUI objects generated by a Universal Client program responsive to a dedicated scripting language.

Still another object of the present invention is to provide a device which is both computer architecture independent and responsive to a dedicated scripting language.

Yet another object of the present invention is to provide a computer architecture independent method for creating user front end GUIs for networked applications displaying information in the form of 3-D graphics.

Another object of the present invention is to provide a computer architecture independent method for creating user front end GUIs for networked applications implementing an expert system.

A further object of the present invention is to provide a computer architecture independent method for creating user front end GUIs for networked applications which could not otherwise interoperate.

Moreover, another object of the present invention is to provide a computer architecture independent method for creating user front end GUIs for networked applications which are server source code language independent.

Still another object of the present invention is to provide a computer architecture independent method for creating user front end GUIs for networked applications compatible with industry Transmission Control Protocol/Internet Protocol (TCP/IP) standards.

Moreover, additional objects of the present invention are to provide a computer system and a computer architecture independent method for creating user front end GUIs for networked applications while reducing software creation, distribution, maintenance and support costs, preserving investments in legacy hardware, improving software reuse, providing architecture independence of dedicated display consoles, improving system survivability and availability (since any single console can perform same the function as any other console), and reducing the cost of new hardware.

These and other objects, features and advantages according to the present invention are provided by a method for operating a computer system having first through third computers interconnected to one another by a communications channel, includes steps for:

(a) storing a document written in hypertext markup language (HTML), the HTML document including an applet tag for invoking a Universal Client device and computer readable first instructions for generating the Universal Client device, on the first computer;

(b) transmitting the HTML document and the first instructions for generating the Universal Client device from the first computer to the second computer via the communications channel;

(c) storing computer readable second instructions for permitting the second computer to utilize a World Wide Web browser providing a JAVA™ virtual machine;

(d) initializing and executing the Universal Client device on the second computer using the JAVA™ virtual machine to thereby generate predetermined graphical user interface (GUI) objects and display the GUI objects on the second computer;

(e) storing computer readable third instructions on the third computer for controlling the third computer during generation of a character string; and (f) processing the third instructions to thereby generate the string;

(g) transmitting the string to the second computer; and (h) modifying at least one of the GUI objects displayed on the second computer responsive to the string.

These and other objects, features and advantages according to the present invention are provided by an operating method for a computer system having first, second and third computers generating a graphical user interface (GUI) on the first computer screen corresponding to a presentation generated with respect to the second computer screen irrespective of the operating system differences between the respective first, second and third computers. Preferably, the operating method includes steps for:

providing a hypertext markup language (HTML) document including an applet tag corresponding to a Universal Client device from the third computer to the first computer;

initializing and executing the Universal Client device using a JAVA™ virtual machine associated with the first computer;

for parsing and interpreting a script associated with the Universal Client device to thereby cause the Universal Client device to display the GUI;

parsing and interpreting the script associated with the Universal Client device to thereby cause the Universal Client device to establish a predetermined connection between the first and the second computers; and generating a string causing changes in the GUI displayed by the Universal Client device on the first computer.

These and other objects, features and advantages according to the present invention are provided by an operating method for a computer system generating a representative graphical user interface (GUI) on a first computer screen corresponding to a presentation generated with respect to a second computer screen irrespective of the operating system differences between the respective first and second computers and a third computer, includes steps for:

providing a hypertext markup language (HTML) document including an applet tag corresponding to a Universal Client device and a first script defining a first GUI;

initializing and executing the Universal Client device responsive to the first script using a JAVA™ virtual machine;

parsing and interpreting the first script to thereby cause the Universal Client device to display the first GUI;

parsing and interpreting the first script to thereby cause the Universal Client device to establish a predetermined connection between the first and the third computers and to generate a second script permitting the Universal Client device to control the second computer;

parsing and interpreting the second script, for generating a first instruction to which the second computer responds;

receiving the first instruction for generating a second instruction representing the presentation displayed on the second computer screen;

receiving the second instruction for generating a third script; and receiving the third script for causing the Universal Client device to replace the first GUI with the representative GUI on the first computer screen.

These and other objects, features and advantages according to the present invention are provided by a method for operating a computer system generating a representative graphical user interface (GUI) on a first computer screen corresponding to a presentation generated with respect to a second computer screen irrespective of the operating system differences between the respective first and second computers and a third computer. The method includes steps for:

providing a hypertext markup language (HTML) document including an applet tag corresponding to a Universal Client device and a first script defining a first GUI;

initializing and executing the Universal Client device responsive to the first script using a JAVA™ virtual machine;

parsing and interpreting the first script to thereby cause the Universal Client device to display the first GUI;

parsing and interpreting the first script to thereby cause the Universal Client device to establish a predetermined connection between the first and the third computers and to generate a second script permitting the Universal Client device to control the second computer;

parsing and interpreting the second script, for generating a first instruction to which the second computer responds;

generating a second instruction representing the presentation displayed on the second computer screen responsive to the first instruction;

generating a third script responsive to the second instruction; and causing the Universal Client device to replace the first GUI with the representative GUI on the first computer screen responsive to the third script.

Additional objects, advantages and novel features of the invention will become apparent to those skilled in the art upon examination of the following description or may be learned by practice of the invention. The objects and advantages of the invention may be realized and attained by means of the instrumentalities and combinations particularly pointed out in the appended claims.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 1 is an illustration of a computer screen depicting an object generated using the JavaScript scripting language and the corresponding JavaScript code listing;

FIG. 2 is a high-level block diagram of a computer system according to the present invention;

FIGS. 6A–6J collectively constitute a listing of the dedicated scripting language interpreted by the Universal Client device in displaying graphical user interface (GUI) objects according to the present invention;

FIGS. 8A–8C collectively denote the dedicated scripting language listing for producing the computer screen illustrated in FIG. 7 using the Universal Client device according to the present invention;

FIG. 9 is a listing of the dedicated scripting language for causing the Universal Client device s according to the present invention to perform a timing function.

DETAILED DESCRIPTION OF THE PREFERRED EMBODIMENTS

Figure 3:
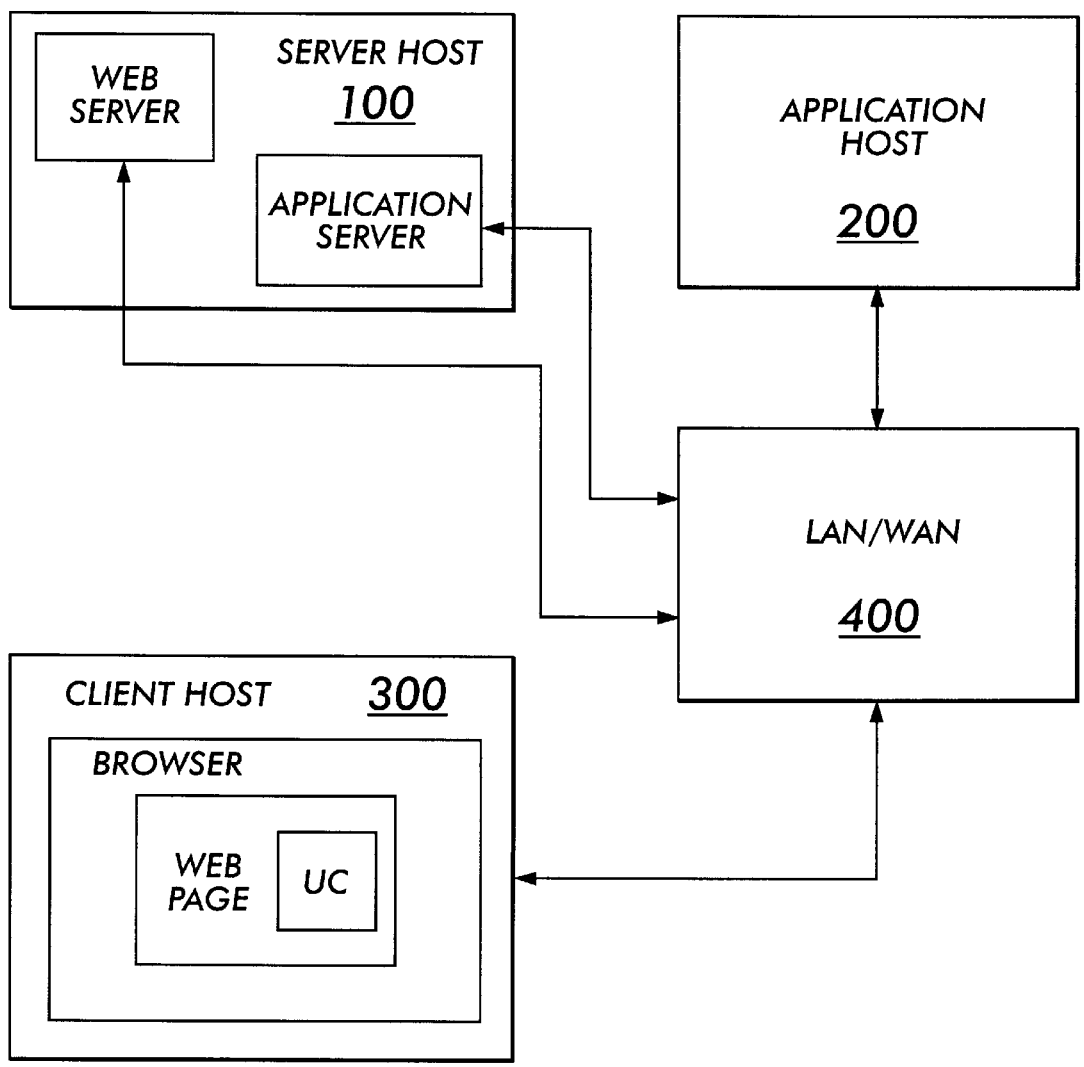
FIG. 3 is a high-level block diagram of selected components of the computer system according to the present invention illustrated in FIG. 2, which illustrates the operation of one of the several alternative operation techniques permitted by the present invention.

One of the principal objects of the present inventions, although certainly not the only one, is to provide a Universal Distributed Display Capability (UDDC) for operating substantially all military applications on any commercial off the shelf (COTS) based system supporting a JAVA™ enabled browser. A preferred embodiment of the present invention accomplishes this objective through a software application written in JAVA™ called the Universal Client device. The Universal Client device advantageously understands a scripting command language called GUIScript. Beneficially, the Universal Client device can present any desired graphical user interface (GUI), including MultiMedia, for any application, through description of the desired GUI in GUIScript. As will be discussed in greater detail below, the Universal Client device advantageously includes an advanced multi-threading architecture and an interactive 3-D library in addition to the traditional window controls one has come to expect in a graphical environment.

The Universal Client device goes far beyond conventional JAVA™ programming. For example, the Universal Client device advantageously can take the local client screen resolution into account. Moreover, the Universal Client device preferably provides information on the operating system running on the client to permit tailoring of the behavior of the provided GUIScript to the running platform. The Universal Client device additionally facilitates networking. In addition, the Universal Client device also has the ability to launch applications on the local client machine when run in a stand alone mode, i.e., without using a browser. Moreover, the Universal Client device is capable of true multitasking, i.e., capable of displaying and/or controlling multiple objects in parallel.

The Universal Client device and GUIScript according to the present invention allows the Government to solve software portability and interoperability problems and, thus, satisfy all of the following goals:

a. Display tactical information on any vendor's modem commercial equipment without modification of the client or legacy software;

b. Permit a battle unit to view any other units' displays even if the other unit uses different display hardware;

c. Bring on-line a tactical display on a low-end machine, e.g., a laptop computer running Windows, to maintain system availability during critical operations such as air traffic control;

d. Reduce software management and porting costs; and e. Deliver a technology for providing training both afloat and ashore, independent of the system on which training is being provided and independent of the training facilities available.

A preferred embodiment of the present invention will now be described while referring to FIG. 2, which illustrates a computer system 1 in high-level block diagram form. Preferably, computer system 1 includes servers 100a through 100n, combat subsystems 200a through 200m, and computers 300a–300r. All of the servers 100a–100n, the combat systems 200a–200m and the computers 300a–300r advantageously are operatively connected to one another via a communications link 400.

In an exemplary case, servers 100a–110n are UNIX servers while the combat systems 200a–200m advantageously can be systems such as radar systems, status boards, etc. Preferably, each of the machines 100a–100n and 200a–200m include a processor, working memory, a storage device such as a hard disk and a communications device, e.g., a network interface card. It should also be mentioned that computers 300a–300r can include desktop computers, laptop computers and/or workstations in any mix. Advantageously, these computers can include a central processing unit, a graphic display processor, the graphic display device, e.g., monitor, a communications device and several memories including both solid state memories, i.e., random access memory (RAM) and a hard disk drive. Preferably, link 400 is a local area network (LAN), although the link 400 advantageously can be a wide area network (WAN) or other interconnection facility such as a frame-based satellite network or even the Internet. Thus, although a JAVA™ enabled web browser is a preferred platform for initiating the Universal Client device according to the present invention, connection to the Internet or World Wide Web is NOT required. The computer system 1 advantageously can be a detached local area network or intranet for practical and security reasons. In an exemplary case, the browser running on one of the clients 300a–300r merely accesses one of the servers 100a–100n in order to launch the Universal Client device.

It will be appreciated that the present invention was developed in response to perceived problems in the interoperability of legacy computer hardware used in combat systems and networks and solved those problems. However, since the ramifications and applications of the present invention go far beyond the interoperability of combat system hardware, the discussion which follows will use appreciably broader terminology in describing the system and corresponding operating methods according to the present invention.

Referring specifically to FIG. 3, a computer system 1 according to the present invention includes a server host 100, an application host 200, and a client host 300, all of which are interconnected to one another via a LAN or WAN 400 (hereinafter LAN 400). It will be appreciated that LAN 400 advantageously can be any communication channel capable of interconnecting the various distributed components of the computer system 1. Preferably, the server host 100 provides both a Web server and an application server, as discussed in greater detail below. The application host 200 advantageously can be another computer running a predetermined program needing to be accessed by the user operating client host 300. Client host 300 beneficially provides a JAVA™ enabled web browser, a web browser implementing a JAVA™ virtual machine, while the Web server on server host 100 stores a web page and associated Applet tag. Thus, using the Applet paradigm, the Universal Client device preferably is embedded as an Applet tag in a World Wide Web page. When the downloading of the web page from the server host 100 to the client host 300, i.e., the web browser on the user's computer, is completed, the web browser identifies the Universal Client device to be downloaded to the user's computer via the World Wide Web server. After the Universal Client device loads, it initializes and runs.

During initialization, the Universal Client device searches the HTML code in the downloaded web page to determine if the Universal Client device has been given GUIScript parameters. In an exemplary case, the Universal Client device can identify the parameters listed in Table 1.

TABLE 1

| Parameter | Action |
| --- | --- |
| GUIScript | Read, parse and process GUIScript scripting language commands embedded or referenced in the HTML code of the web page containing the Universal Client device's Applet tag. |
| HostName/Port | Establish a standard TCP/IP socket connection to the server given by "HostName" and connect on the identified logical port number given by "Port." |

The Universal Client device advantageously can process the "GUIScript" parameters and then the "HostName/Port" parameters. It should be mentioned that when the Universal Client device is required to establish a standard socket connection per one of the aforementioned parameters, then another host server program, in addition to the web server, must exist to host the socket connection and communicate with the Universal Client device via GUIScript. It should also be mentioned that the use of both of the listed parameters is optional.

When the Universal Client device on client host 300 runs, it will connect to the Application Server running on sever host 100. Moreover, the Universal Client device will load and interpret a GUIScript file which defines all the display windows and their operation for the application running on application host 200. The Universal Client device will then display the appropriate GUI to the user. The user can then run the application via the Universal Client device, which will transfer data to the application via the intermediate Application Server running on sever host 100. It will be appreciated that the Application Server advantageously can translate the application specific message traffic to a format compatible with the Universal Client device, i.e., GUIScript.

Preferably, multiple ones of the clients 300a–300r illustrated in FIG. 2 may be connected to Application Server running on sever host 100. In short, the combination of a JAVA™ enabled web browser and the Universal Client device advantageously allows any COTS-based client host to operate the application running on application host 200.

Figure 4:
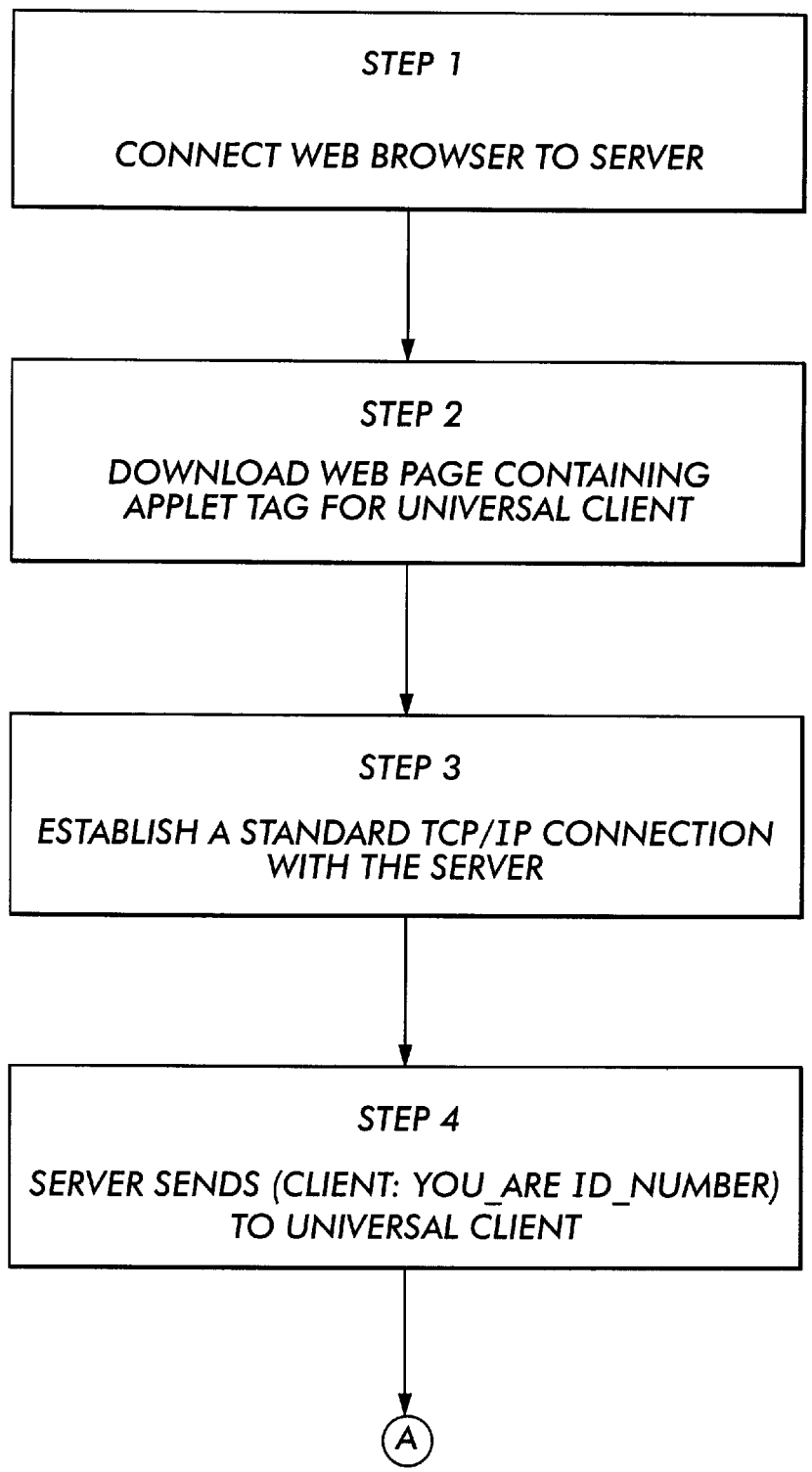
FIG. 4 is a flowchart of the start-up sequence of the computer system according to the present invention illustrated in FIG. 3.

A detailed discussion of the start-up sequence of the computer system according to the present invention will now be provided. As illustrated in the flowchart of FIG. 4, the client host 300 establishes communication with server host 100 via LAN 400 during step 1. More specifically, a JAVA™ enabled web browser, i.e., a web browser running a JAVA™ virtual machine, operating on client host 300 connects to the web server running on server host 100 via LAN 400. It will be appreciated from the discussion that at least one of the web pages residing on or reachable through sever host 100 includes the Universal Client device embedded in the web page as an Applet tag. Step 1 is completed when the web page with the embedded Universal Client device is selected.

During step 2, the web page including the Universal Client device and any associated GUIScript is downloaded, in an exemplary case, from server host 100 to the web browser running on client host 300 via LAN 400. As previously mentioned, after the Universal Client device has been downloaded to client host 300, the Universal Client device initializes and runs. During initialization, the Universal Client device searches the HTML code in the downloaded web page to determine if the Universal Client device has been given GUIScript parameters. Whether or not GUIScript is provided, the Universal Client device interprets the indicated GUIScript and prepares and projects the scripted GUI onto the screen of the client host 300.

For purposes of the discussion which follows, it will be assumed that the Universal Client device running on client host 300 will connect to an application server running concurrently on server host 100. Preferably, the application server permits the user to control an application which is actually running on application host 200, as will be discussed in greater detail below. However, it will be appreciated that the client host 300a advantageously can establish a connection to server host 100n, instead of server host 100a, when the GUIScript downloaded from server host 100a includes the Uniform Resource Locator (URL) pointing to server host loon of FIG. 2. Moreover, it will be appreciated that the client host 300 need not be connected to a server host at all. For example, the client host 300 advantageously could be used to download and display a training session to the user, which session could include audio and video clips or timed GUIScripts designed to replay a predetermined sequence of graphical images, provided that the training materials were available to the Universal Client device on client host 300. Additional alternatives will suggest themselves to those of ordinary skill in the art and all such alternatives are considered to be within the scope of the present invention.

Returning to the flowchart of FIG. 3, the Universal Client device running on client host 300 advantageously establishes a TCP/IP socket connection with the application server running on server host 100. It will be appreciated that the Universal Client device advantageously can read, parse and process the GUIScript commands embedded or referenced in the HTML code of the web page containing the Applet tag for the Universal Client device. As mentioned previously, the client host running the Universal Client device establishes a standard TCP/IP socket connection to the server host identified by "HostName" and will connect to that server host on the identified logical port number given by "Port." In the exemplary case being discussed, the client host 300 establishes a standard TCP/IP connection with server host 100 during step 3.

It should be mentioned here that the Universal Client device has a well-defined Application Programming Interface (API) to provide a definition for interfacing a server to the Universal Client device. The Universal Client device contains a parser and processor module for executing GUIScript. The server host 100 advantageously contains a parser and processor module for executing GUIScript to the extent necessary to facilitate meaningful communications with the Universal Client device on client host 300. The server host 100 preferably is responsible for defining the application for the Universal Client device. The server host 100 advantageously can be built from technology different from that used in creating the Universal Client device.

After the Universal Client device on the client host 300 establishes the Transmission Control Protocol/Internet Protocol (TCP/IP) socket connection, the host server 100 immediately responds, in an exemplary case, to the Universal Client device with the characters "(Client:you__are id__number)," where id__number is a unique 8-digit integer, during step 4. It will be appreciated that a computer-generated server host socket hashcode value is generally recommended for id__number, since it is guaranteed to be unique and since it identifies the logical socket connection between the server host 100 and the client host 300 running the Universal Client device. It should be mentioned that the server host 100 advantageously can selectively send GUIScript to multiple client hosts 300a–300r, as shown in FIG. 2, by filtering the id__number.

Figure 7:
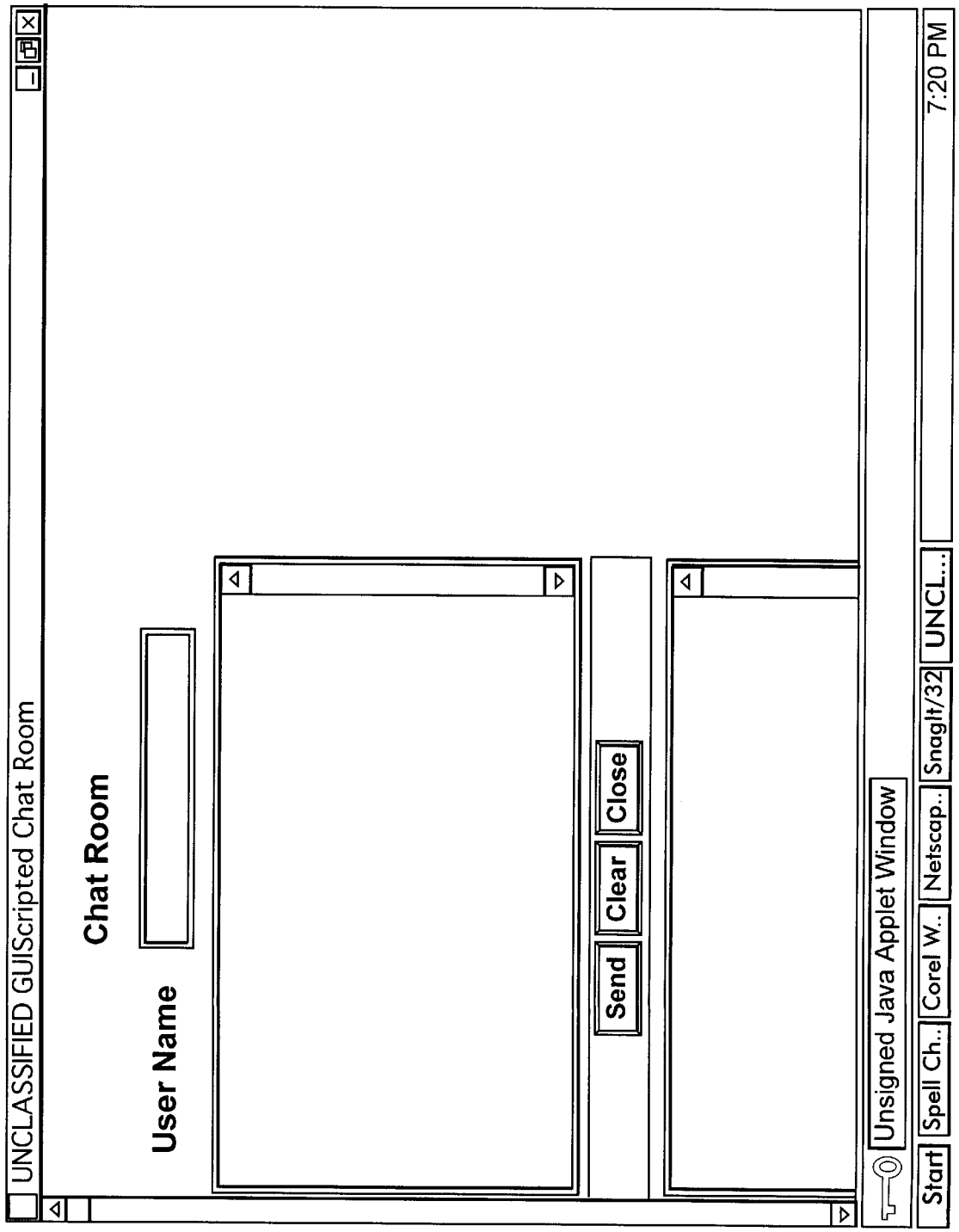
FIG. 7 is an illustration of a computer screen showing the output of an exemplary application using the Universal Client device.

It should be mentioned at this point that any number of the multiple client hosts 300a–300r can be interactively connected to one another either by LAN 400 alone of through server 100 via LAN 400. Thus, client hosts 300a and 300b can be directly connected to one another so that the users can communicate with one another. FIGS. 7 and 8, which are discussed in greater detail below, illustrate an exemplary chat room which can be established between two or more users. It should also be mentioned that a single client host 300a advantageously can be connected to, for example, multiple application hosts 200a–200m so that the GUI displayed using the Universal Client device includes data generated by several different application hosts 200a–200m. Of course, when referring to combat system applications, several client hosts 300a–300r preferably display the data generated by the application hosts 200a–200m, although each of the client hosts 300a–300r may display received information filtered through a unique GUI.

It will be appreciated that the purpose of the "Client:you__are" message is to provide the Universal Client device with a unique identifier such that the server host 100 can distinguish which of the client hosts 300a–300r is sending GUIScript transmissions and positively identify which one of the client hosts 300a–300r will receive a GUIScript message from server host 100 via LAN 400. From this point on, any data sent from the Universal Client device will be appended with the client id__number. Once the Universal Client device has the client id__number, the next communication may be initiated by either the Universal Client device on the client host 100 or the server host 300. Each communication advantageously can be in the form of GUIScript, although the present invention is not limited Universal Client device which are responsive to GUIScript messages. It should be mentioned that the Universal Client device advantageously can respond to other stimuli such as an ASCII character string and datagram.

The Universal Client device beneficially can be made interactive to a character string by employing, for example, a so-called "wait-for" command which causes the Universal Client device to respond in a predetermined way when a character string having a specified format is received. Thus, the Universal Client device can process information from a data base application in an exemplary case. Although the preceding discussion has been with respect to display of GUI objects using the Universal Client device, it should be mentioned that the present invention is not so limited. The Universal Client device advantageously controls objects, e.g., JAVA™ objects, which objects need not be displayed or even displayable to the user. For example, the object implemented on the Universal Client device advantageously may receive the results of a data base query and translate the received data into another format particularly suited to yet another object.

Preferably, GUIScript can instantiate any GUI object common between Microsoft Windows, X-Windows and the JAVA™ "awt" graphics library. Additionally, GUIScript can instantiate the Universal Client's 3-D graphics visualization object as part of the GUI front end. Advantageously, GUIScript also defines the action that occurs when a GUI object is operated by the user. For example, GUIScript defines what the application program running on application server 200 does when the user clicks a particular button on the graphical user interface of the client host 300. It will be appreciated that operation of the GUI-button can be used to send a command back to the host server 100, which command may be directed to the server host 100 and/or the application host 200, open another window, or both. Thus, any number of actions may be performed responsive to the operation of a GUI-button, i.e., when the button is clicked. The actions, called "events," beneficially are defined in the GUIScript language.

The interactions between the client host 300, the server host 100 and the application host 200 will now be discussed while referring to the flowchart of FIG. 5, which flowchart illustrates the overall operation of the computer system 1 illustrated in FIG. 3. The connection functions provided by LAN 400 are substantially transparent to the user and, for that reason, will be ignored. It will be noted that the steps 1–4 in the flowchart of FIG. 4 must have been completed before initiating the steps depicted in FIG. 5.

Figure 5:
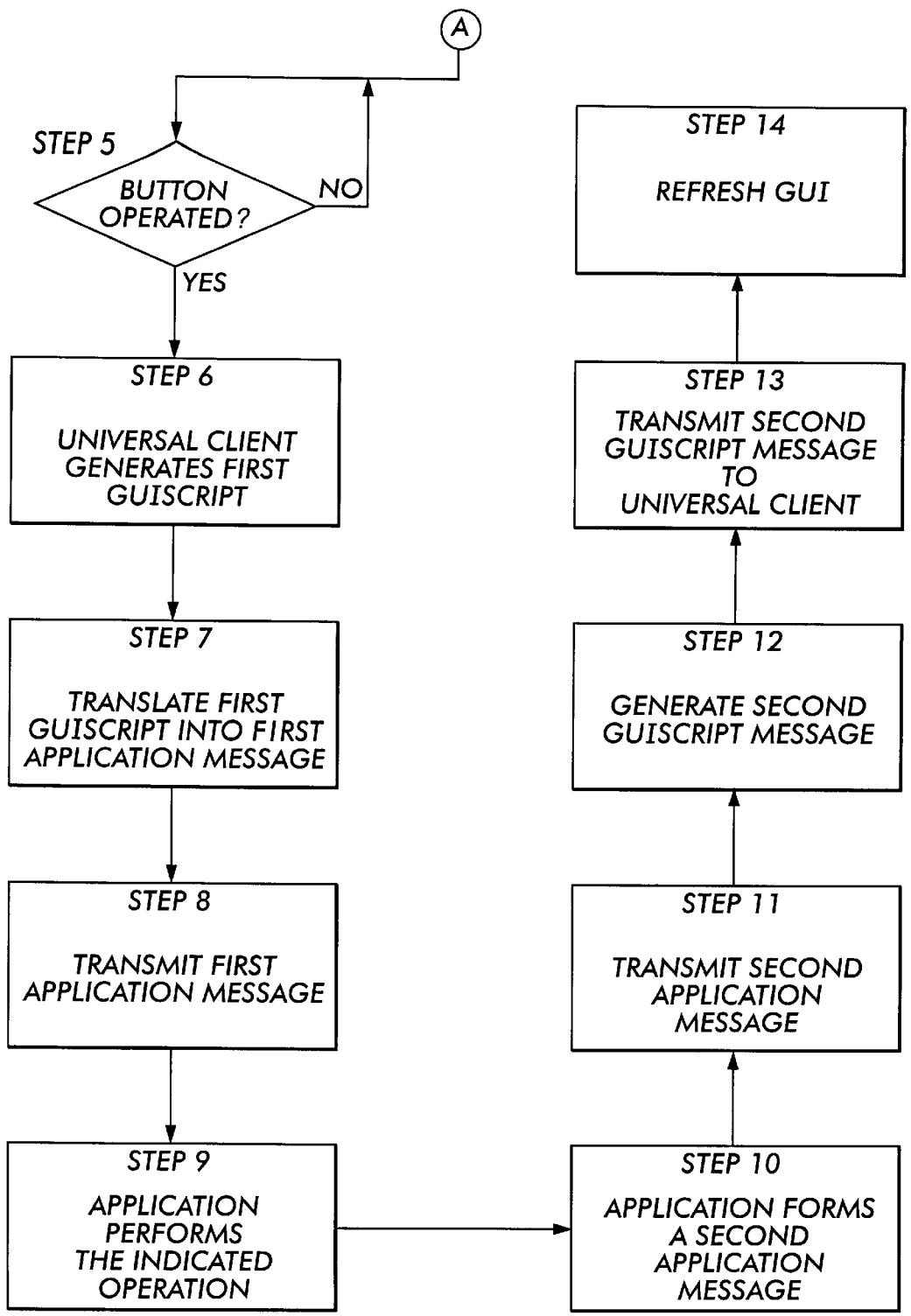
FIG. 5 is a flowchart illustrating the basic operating steps of the computer system according to the present invention illustrated in FIG. 3.

During step 5 of FIG. 5, the Universal Client device running on client host 300 repeatedly performs a check to determine whether one of the buttons on the GUI has been operated, i.e., clicked. When the answer is negative, the check repeats. However, when the answer is affirmative, the Universal Client device, in an exemplary case, generates a first GUIScript message and transmits the first GUIScript message to the application server running on server host 100 during step 6. When the first GUIScript message is received, step 7 is performed to translate the first GUIScript message into a first application message. It will be appreciated that the first application message is in a format suitable for parsing and interpretation by the application running on application host 200. The first application message is then transmitted by the application server on server host 100 to the application running on application host 200 during step 8.

The application performs the operation indicated in the first application message during step 9 and then forms a second application message during step 10. It will be appreciated that this second application message often includes information denoting a change in the appearance of the GUI displayed on client host 300. During step 11, the second application is transmitted from application host 200 to server host 100. In response to the second application message, the application server running on server host 100 generates a second GUIScript message during step 12. The second GUIScript message is then transferred to the Universal Client device on client host 300 at step 13 and is subsequently used by the Universal Client device in generating a refreshed GUI during step 14.

It will be noted that the actual operation of the computer system 1' employing the Universal Client device, which is responsive to the GUIScript written in the GUIScript scripting language, can be much more complex than the rudimentary operation steps illustrated in FIG. 5. For example, it will be noted that the effect of the operation of a single button on the GUI running on client host 300*a* can eventually be reflected in the GUI running on client host 300*r*, i.e., in the computer system 1 illustrated in FIG. 2. Moreover, an application such as a radar system advantageously can generate data which will eventually arrive at the Universal Client device running on client host 300 in the form of an incoming GUIScript message even though a corresponding outgoing GUIScript message was not generated.

In summary, objects, functions and advantages according to the present invention are provided by a computer executing a Universal Client device responsive to a GUIScript written in the GUIScript scripting language. Additional details regarding the GUIScript scripting language, as well as several illustrative examples will now be presented while referring to FIGS. 6A through 9.

The GUISCRIPT Syntax Diagram illustrated in FIGS. 6A–6J consists of definitions, each of which has a "left-hand side" (LHS) and a "right-hand side" (RHS). Each definition is made up of "tokens". A token is a group of characters meant to be used as a unit. In the Syntax Diagram (FIGS. 6A–6J), tokens are separated by "whitespace" (tabs, spaces and/or line-feeds), though that is not always necessary in an actual GUIScript. Only when two adjacent tokens are entirely made up of alphanumeric characters is intervening whitespace necessary.

It will be appreciated that the GUIScript Syntax Diagram follows standard Backus-Naur Form (BNF) notation, which is a preferred notation for the formal description of programming languages. While BNF notation is most commonly used to specify the syntax of "conventional" programming languages such as Pascal and C, BNF notation advantageously can be used in command language interpreters and other language processing.

Advantageously, there are three kinds of tokens: "nonterminals"; "terminals"; and "comments". Nonterminals are spelled using all UPPERCASE characters and underscores (_), and are never quoted. Comments are described in the Syntax Diagram, but are identical to the two types of JAVA™ or C++ comments. In contrast, a terminal is any token that isn't a comment or a nonterminal. In addition, some characters are used as "metatokens", which are explained in greater detail below.

Preferably, the LHS consists of exactly one nonterminal and a "neck". It always begins in the first column of a definition. The neck, represented by the characters "==", separates the nonterminal from the RHS. Advantageously, the RHS consists of one or more "replacement rules", each rule generally appearing on a separate line below the LHS. It will be noted that multi-line replacement rules are separated by the "|" character. Moreover, a replacement rule is made up of one or more terminals and/or nonterminals. It will be noted that a few nonterminals, e.g., "ANYTHING", are not defined; the GUIScript developer can determine what these represent.

In order to make a GUIScript, it is preferable to start with either a nonterminal GUISCRIPT or a MESSAGE (and/or comments). Then replace each nonterminal with the text for exactly one of the nonterminal's replacement rules; perform this operation on the result recursively until there are no nonterminals remaining.

With respect to Metatokens, opposing single quotes (' and ') are used to "escape" the characters they delimit. The enclosed characters are meant to be taken literally, rather than as a nonterminal or metatoken. It will be appreciated that the single quotes are not part of the token. Other canons of GUIScript construction are as follows:

a. A pound-sign (#) represents a single digit character ('0' through '9');

b. The ampersand (&) represents an alphabetic character, either upper- or lower-case;

c. A question mark (?) after a token indicates that it occurs at most once;

d. A plus (+) after a token indicates that it must occur at least once;

e. An asterisk (*) after a token indicates that it may occur zero or more times;

f. Brackets ([ and ]) are used to group tokens to enable one of the two preceding metatokens to operate on the group as if it were a single token. A bracketed group without a trailing metatoken denotes that the group of tokens is optional;

g. If an optional token or group has a default value, it is enclosed in angle-brackets (< and >) immediately after the token or group;

h. A range of numbers is represented by {MIN:MAX}. One of the numbers may be missing; in that case, the range has no minimum/maximum. The type of number expected—integer or floating point—is indicated by the format of the number. Incidentally, an integer number may be used in place of a floating point number, but not the reverse. A floating point number whose absolute value is less than one is not required to have a leading zero;

i. Comments about items in the syntax diagram begin with "//" and go to the end of the line.

In order to better appreciate both the power and the ease of using the GUIScript command language, an exemplary computer screen is depicted in FIG. 7 while the corresponding GUIScript for generating that screen, which in this particular case is the front end for a so-called chat room, is listed in FIGS. 8A–8C, collectively. It will be appreciated that the GUIScript shown in FIGS. 8A–8C is parsed and interpreted by the Universal Client device, which then generates the chat room GUI for display on the client host 300. A complete listing for an exemplary Universal Client device is provided in the attached Appendix. As discussed above, several clients 300a–300r advantageously can communicate among themselves using, in an exemplar case, the chat room paradigm. It will be appreciated that the Universal Client device listing is an exemplary, and not a limiting, preferred embodiment of the present invention.

In the discussion above, it was generally assumed that the GUIScript executed by the Universal Client device on the client host 300 was stored on server host 100; this is but one of several possibilities. As mentioned previously, while an exemplary preferred embodiment of the Universal Client device is delivered over the World Wide Web, the Universal Client device advantageously can be executed on a single client host 300; thus, the default startup HTML document includes either a URL specifying that the Universal Client device is stored on the client host 300 or the GUIScript employed by the Universal Client device on startup. Alternately, the GUIScript can be stored either on server host 100 or application host 200. It should be mentioned, in the latter case, that it will be necessary to establish another TCP/IP between the client host 300 and the server host 100, so as to facilitate ultimate connection to application host 200. When the GUIScript is starred on server host 100, the TCP/IP connection used in downloading the Universal Client device will suffice.

Figure 10:
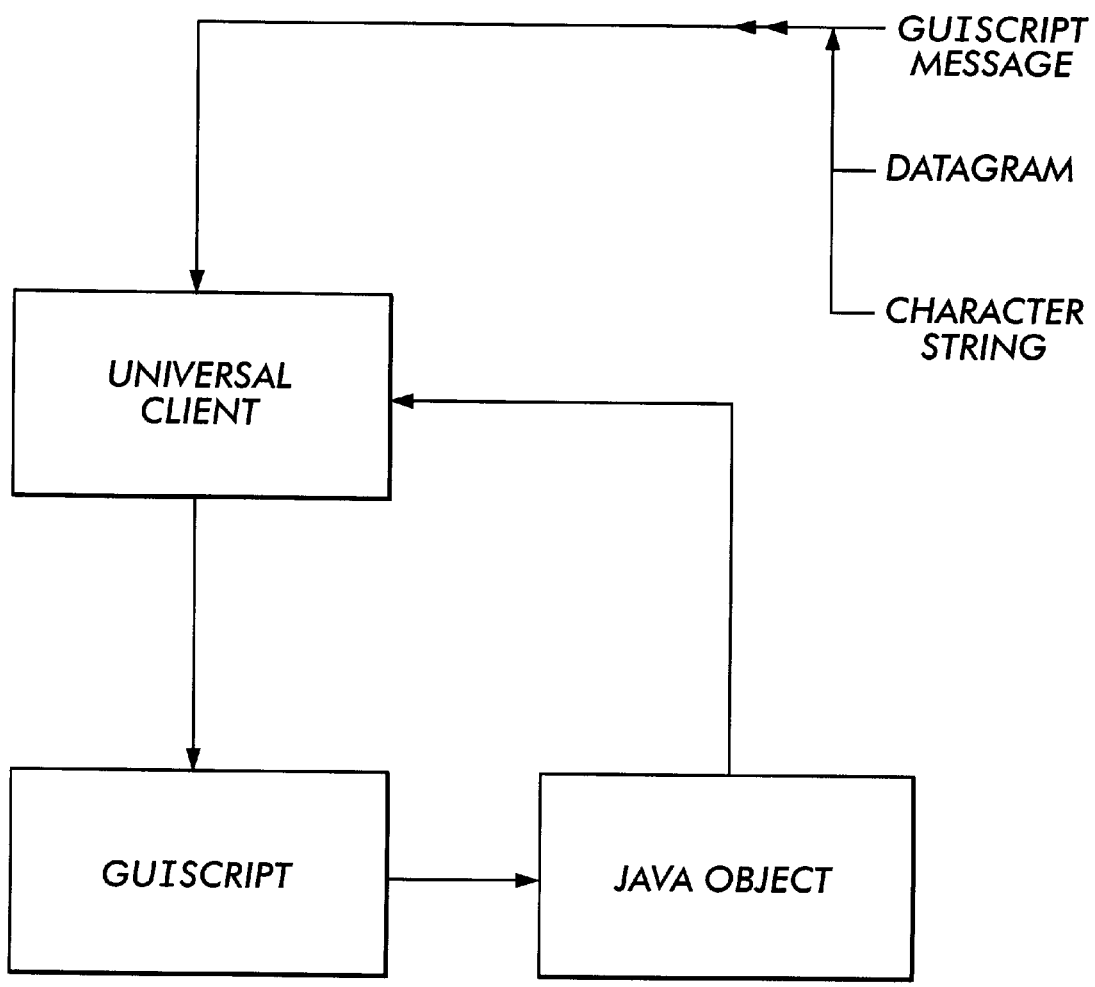
FIG. 10 is a high level block diagram illustrating the interaction paths between the Universal Client device and an object in a class library in response to various stimuli.

Referring now to FIG. 10, it should be mentioned that the Universal Client device was specifically developed to interpret objects, most preferably JAVA™ objects, although any GUI object common between Microsoft Windows, X-Windows and the JAVA™ "awt" graphics library can be employed. As shown in FIG. 10, the Universal Client device, which advantageously may include modules (discussed below), interprets JAVA™ objects. Advantageously, the Universal Client device can interpret a JAVA™ object directly or can interpret a JAVA™ object under the direction of a GUIScript. In the preferred embodiment discussed above, the object is controlled through GUIScript. It will be appreciated that the Universal Client device responds to any or all of GUIScript messages, datagrams and character strings. Moreover, the Universal Client device advantageously may respond to CORBA Object Request Broker (ORB) calls. CORBA provides a communication infrastructure for invoking operations on objects transparently with respect to where they are located on the network, the types of hardware and operating system platforms on which they execute, differences in data representations between platforms, the languages in which objects are implemented, and network transports used to communicate with them. CORBA specifies all of the functions that must be provided by an ORB and a set of standard interfaces to those functions.

As mentioned immediately above, the Universal Client device preferably can be configured as several stand alone modules to conform the development environment to the developers particular needs as well as to increase the execution speed of the Universal Client device. For example, when a sophisticated developer, who is familiar with the process of writing objects directly, employs the Universal Client device, that developer may have no need for GUIScript. In that case, the GUIScript interpretive module need not be included with the Universal Client device. Thus, the Universal Client device advantageously can be optimized based on the particular needed of the GUI developer.

One potential application for a computer system employing the Universal Client device employing a GUIScript according to the present invention is an automated weapon doctrine conflict resolver called the Intelligent Doctrine Engagement Architecture (IDEA). IDEA includes: a client: which provides the user with a graphical user interface, e.g., 3-D graphics, and receives user inputs; a server, which processes the received user inputs to produce instructions in the format required by an expert system to resolve conflicts in doctrine and to produce the GUIScript needed to display the expert system output on the client; and the aforementioned expert system. For IDEA, the Universal Client, 3-D graphics, server and expert system are preferably written in the JAVA™ programming language by Sun Microsystems. The Universal Client device advantageously runs as an Applet in any JAVA™-enabled World Wide Web browser.

Another potential application of a computer system employing the Universal Client device with a GUIScript according to the present invention is the simulation-based design database for the so-called Leading Edge Advanced Prototyping for Ships (LEAPS). LEAPS includes a client, which provides the user with a graphical user interface, e.g., graphics, and produces GUIScript-formatted user inputs, and a server, which processes user inputs and outputs additional GUIScripts to the client. For LEAPS, the Universal Client device and graphics are written in the JAVA™ programming language by Sun Microsystems. The LEAPS server software and database are advantageously written in C++. Beneficially, since the Universal Client device process an JAVA™ object in any JAVA™-enabled World Wide Web browser, hardware capable of running the JAVA™ virtual machine can be used as the client in the LEAPS computer system.

Although the present invention has been discussed in terms of the JAVA™ programming language, it will be appreciated that other programming languages advantageously may be employed. For example, the Universal Client device may be provided by software algorithms written in the Python programming language and executed via a Python interpreter. It should be mentioned that the Universal Client according to the present invention can run as a stand-alone application or as an Applet in any JAVA™-enabled World Wide Web browser, i.e., the choice of the JAVA™ programming language is completely arbitrary. Any architecture independent supported language, such as Python, could be used. A common embodiment of the Universal Client is as an Applet because of the readily available World Wide Web browser Hypertext Markup Language (HTML) interface. It will also be appreciated that the Universal Client device may be provided by dedicated integrated circuits or programable logic devices instead of software.

Thus, the Universal Client device and corresponding operating method provides the mechanism to remove requirements for specific embedded display capabilities from any distributed system architecture. Although current distributed systems may include proprietary complex software designs tailored to closely coupled display technologies, the Universal Client device advantageously opens the system architecture by decoupling the embedded display software from the distributed system. It will be appreciated that the Universal Client device and corresponding operating method provides the capability to distribute any graphical user interface (GUI) to any commercial off the shelf (COTS) based display console in an architecture independent way. In particular, the Universal Client device and corresponding method according to the present invention permit server-based applications to be simultaneously presented on COTS systems, e.g., Windows-based PCS, Silicon Graphics Incorporated (SGI) Unix workstations, etc. This paradigm also allows the Government to separate the distributed system into functional components to thereby simplify system upgrades and data fusion for improved intelligent agent automation. It should also be mentioned that this capability advantageously can be used during both retrofitting and upgrading existing systems.

It should also be noted that the GUIScript-responsive Universal Client device is not limited to displaying objects forming the GUI for the client host 300. As previously mentioned, the GUIScript advantageously can be used to command playback of MultiMedia files, e.g., audio and video files. According to one aspect of the present invention, the Universal Client device advantageously can display several objects simultaneously, e.g., a MultiMedia object can be displayed while an associated page of a service manual is retrieved and displayed in a text window. According to yet another aspect of the present invention, the GUI advantageously can be used to control the browser directly to facilitate multi-threaded operations.

Additionally, objects can be written to perform other functions such as timing the duration between two events. For example, JAVA™ objects advantageously can be generated to measure the elapsed time between the display of predetermined information on the client host 300 and the user's response to the predetermined information. Moreover, another JAVA™ object can be used to measure system performance, e.g., time duration be generation of a datagram and display of information corresponding to the datagram on the GUI. An exemplary JAVA™-sourced object for a so-called DeltaTimer is illustrated in FIG. 9. One of ordinary skill in the art will immediately perceive many operations of the Universal Client device which could beneficially employ the DeltaTimer. For example, the DeltaTimer advantageously could be used in training applications to determine the elapsed time between the display of an object and the user's operation of the GUI in response to that particular displayed object. Morever, system performance advantageously can be timed using the DeltaTimer GUIScript within a larger GUIScript.

As previously mentioned, the Universal Client device does not necessarily generate a GUI to display all information relayed to the Universal Client device. This feature advantageously can be used in implementing a more robust computer system. In an exemplary case, all applications passing information to the Universal Client device as, for example, GUIScript messages and/or datagrams beneficially can provide so-called "heart beats" to the Universal Client device. In the event that the heart beat corresponding to a particular application ceases, the Universal Client device advantageously can attempt to connect to the application via secondary route. Alternatively, the Universal Client device can drop the connect to that application and establish a connection to a back-up application host. Thus, the Universal Client device can be configured to automatically connect to a machine running a needed application without user interaction.

Moreover, information on each user such as screen preferences advantageously may be stored at a remote location, e.g., server host 100. In the event that the user's client terminal 300 malfunctions, the user can reestablish a connection to the server host 100 using another client machine and the Universal Client device with present the user with his particular GUI preferences. Thus, the user who routinely connects using a PC having a relatively low resolution screen could reestablish a connection via a workstation with a high resolution screen. The user need only execute a so-called "resize %" command to adjust the GUI to a screen size better suited to the high resolution display.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

```
/* $Id: ClientInterpreter.java,v 1.33 1997/06/12 16:02:23 tmclint Exp $ */ import java.io.*;
import java.awt.*;
import java.net.*;
import java.util.*;
import java.applet.*;

/************************************************************************
**
** class ClientInterpreter
**
************************************************************************/
public class ClientInterpreter implements Receiver
{
  protected IDEA idea;
  protected TextArea errorTextArea = null;
  protected int fontFudgeFactor;

/************************************************************************
  **
  ** ClientInterpreter constructor
  **
  ************************************************************************/
  public ClientInterpreter(IDEA parent)
  {
    idea = parent;

//    String s = "abcdefghijklmnopqrstuvwxyzABCDEFGHIJKLMNOPQRSTUVWXYZ";
//    Font f = new Font("TimesRoman", Font.PLAIN, 10);
//    Frame F = new Frame();
//    F.show();
//    Graphics g = F.getGraphics();
//    F.hide();
//    F.dispose();
//    FontMetrics fm = g.getFontMetrics(f);
//    System.out.println("string length = " + fm.stringWidth(s));
  } // end constructor static final PrintStream ERR = System.err; // a convenience
  static final PrintStream OUT = System.out; // a convenience
  static int msgNum = 1;

/************************************************************************
  **
  ** makeErrorTextArea(rows, cols)
  **
  ** Creates (only one) text area for ClientInterpreter error messages to be
  ** displayed in.
  **
  ************************************************************************/
  public TextArea makeErrorTextArea(int rows, int cols)
  {
    if (errorTextArea != null) // it has already been created
      return null;
```

```
  errorTextArea = new TextArea(rows, cols);
  return errorTextArea;
}

/************************************************************************
**
** errorTextArea()
**
************************************************************************/
public TextArea errorTextArea()
{
  return errorTextArea;
}

/************************************************************************
**
** PrintArgs(args)
**
************************************************************************/
public static void PrintArgs(S_Expr args)
{
  Tracer.trace("PrintArgs", "[" + args + "]");
  while (!args.isEmpty())
  {
    String printstr = args.getNext();
    Tracer.trace("PrintArgs", "printstr = [" + printstr + "]");
    OUT.print(printstr);
  }
  OUT.println();
} // end PrintArgs()

/************************************************************************
**
** guiscript argument "types"
**
************************************************************************/
public final static int INTEGER = 1; // optional - followed by at least one digit
public final static int FLOAT   = 2; // INT with exactly one .
public final static int NUMBER  = INTEGER | FLOAT;

// A STRING is anything surrounded by any combination of single and double quotes.
// The \ is used to "escape" quotes, itself and to represent carriage-return as
// \n, tab as \t and any byte as \xXX (where X is 0-9 or A-F).
public final static int STRING = 4;

// A CLASS identifier begins with a capital letter, must have at least one lower-
// case letter and may contain letters, digits and the _ character.
public final static int CLASS = 8;

// An ACTION identifier is like a CLASS identifier except that it begins with a
// lowercase letter.
public final static int ACTION = 0X10;
```

```
   public final static int CONSTANT = CLASS | ACTION;

// A PATH is like a CONSTANT except that it begins with the _ character
   // and may contain one or more instances of the > character.
   public final static int ABS_PATH = 0X20; // MUST contain at least one > character
   public final static int REL_PATH = 0X40; // must NOT contain any > characters
   public final static int PATH = ABS_PATH | REL_PATH;

public final static int IDENTIFIER = CONSTANT | PATH;

// public final static int FUNCTION = 0X80; // surrounded by {}
//
// public final static int MACRO = 0X100; // surrounded by []
//
// public final static int LEFTPAREN = 0X200;
// public final static int RIGHTPAREN = 0X400;
// public final static int LEFTBRACKET = 0X800;
// public final static int RIGHTBRACKET = 0X1000;
// public final static int LEFTBRACE = 0X2000;
// public final static int RIGHTBRACE = 0X4000;
//
// public final static int S_EXPRESSION = 0X8000;
//
// public final static int OPTIONAL = 0X10000; // ?
// public final static int ANY_NUMBER = 0X20000; // *
// public final static int AT_LEAST_ONE = 0X40000; // +

/*************************************************************
   **
   ** getToken(string, nth, delimiters) -
   **
   ** NOTE: The first token in string is probably the key name of the object,
   ** so I chose to make nth zero-based.
   **
   *************************************************************/
   static String getToken(String string, int nth, String delimiters)
   {
     Tracer.trace("ClientInterpreter.getToken",
                  "string = [" + string + "]; nth = " + nth);
     StringTokenizer st = new StringTokenizer(string, delimiters);
     String token = "";

if (nth >= 0 && st.countTokens() > nth)
       for (int i = 0; i <= nth; i++)
         token = st.nextToken();
     return token;
   } // end getToken()

/*************************************************************
   **
   ** eval(args)
   **
   *************************************************************/
```

```
public String eval(S_Expr args)
{
  String delimiters = " \t\n\r"; // whitespace characters
  Tracer.trace("ClientInterpreter.eval", "args = " + args);
  String functorstr = args.getFirst();
  int functor = Guiscript.getFunctorID(functorstr);
  Assert.prompt(errorTextArea, functor != Guiscript.NO_FUNCTOR,
          "invalid functor: " + functorstr);

switch (functor)
  {
    case Guiscript.GET_GARBAGE:
    if (garbageMessage != null)
      return garbageMessage;
    else
      return "";

case Guiscript.GET_PROPERTY:
    String property = args.getFirst();
    String defaultValue = "";
    if (!args.isEmpty())
      defaultValue = args.getNext();
    Tracer.trace("eval:getProperty", "property = [" + property +
                        "]; defaultValue = [" +
                        defaultValue + "]");
    return getProperty(property, defaultValue);

case Guiscript.GET_TOKEN:
    Tracer.trace("ClientInterpreter.eval", "args = " + args);
    String string = args.getQuotedString();
    Tracer.trace("ClientInterpreter.eval", "string = [" + string + "]");
    int nth = args.getint();
    if (!args.isEmpty())
      delimiters = args.getQuotedString(); // not including the quotes
    return getToken(string, nth, delimiters);

case Guiscript.GET_VALUE:
    String key = args.getNext();
    Object object = idea.Lookup(key);
    if (!Assert.check(errorTextArea, object != null,
              key + " is not present in the idea"))
      return "";
    String value = getvalue(object);
    Tracer.trace("ClientInterpreter.eval", "value = " + value);
    return value;

case Guiscript.RETRIEVE:
    return idea.retrieve(args.getNext());

default:
    return "";
  }
} // end eval()
```

```
/***********************************************************************
**
** newMovieScript(args)
**
***********************************************************************/
public void newMovieScript(S_Expr args)
{
  Tracer.trace2("newMovieScript", args.toString(1024));
  String key = args.getFirst();
  idea.Register(args.toString(), key);
} // end newMovieScript()

/***********************************************************************
**
** newFrame(args)
**
***********************************************************************/
public Frame newFrame(S_Expr args)
{
  String key = args.getFirst();
  String title = args.getNext();
  Frame frame = new Window_Frame(idea, title);
  idea.Register(frame, key);
  Tracer.trace("newFrame", "key: " + key + "; frame: " + frame);
  while(!args.isEmpty())
  {
    S_Expr arg = new S_Expr(this, args.getNext());
    Tracer.trace("newFrame", "arg: " + arg);
    String cmdstr = arg.getFirst();
    Tracer.trace("newFrame", "cmdstr: " + cmdstr);
    int command = Guiscript.getCmdID(cmdstr);
    Assert.prompt(errorTextArea, command != Guiscript.NO_COMMAND,
            "invalid command: " + cmdstr);
    ProcessMsg(frame, command, arg);
  }
  return frame;
} // end newFrame()

/***********************************************************************
**
** newChatBox(args)
**
***********************************************************************/
public Frame newChatBox(S_Expr args)
{
  String key = args.getFirst();
  boolean isJess = true;
  if (key.startsWith("nonJess"))
    isJess = false;
  Frame frame = new ChatBox(idea, isJess);
  idea.Register(frame, key);
  while(!args.isEmpty())
  {
    S_Expr arg = new S_Expr(this, args.getNext());
```

```
      String cmdstr = arg.getFirst();
      int command = Guiscript.getCmdID(cmdstr);
      Assert.prompt(errorTextArea, command != Guiscript.NO_COMMAND, "invalid
command: " + cmdstr);
      ProcessMsg(frame, command, arg);
    }
    return frame;
  } // end newChatBox()

/************************************************************************
  **
  ** newPingBox(args)
  **
  ************************************************************************/
  public Frame newPingBox(S_Expr args)
  {
    String key = args.getFirst();
    Frame frame = new PingBox(idea);
    idea.Register(frame, key);
    while(!args.isEmpty())
    {
      S_Expr arg = new S_Expr(this, args.getNext());
      String cmdstr = arg.getFirst();
      int command = Guiscript.getCmdID(cmdstr);
      Assert.prompt(errorTextArea, command != Guiscript.NO_COMMAND, "invalid
command: " + cmdstr);
      ProcessMsg(frame, command, arg);
    }
    return frame;
  } // end newPingBox()

/************************************************************************
  **
  ** addFrame(args)
  **
  ************************************************************************/
  public Frame addFrame(Container parent, S_Expr args)
  {
    String key = args.getFirst();
    String title = args.getNext();
    Frame frame = new Window_Frame(idea, title);
    addComponent(parent, frame, key);

Tracer.trace("addFrame", "key: " + key + "; frame: " + frame);
    while(!args.isEmpty())
    {
      S_Expr arg = new S_Expr(this, args.getNext());
      int command = arg.getCommand();
      Assert.prompt(errorTextArea, command != Guiscript.NO_COMMAND,
              "unrecognized command " + arg.getPrevCommand());
      ProcessMsg(frame, command, arg);
    }
    return frame;
  } // end addFrame()
```

```
/************************************************************************
**
** addWindow_IDEA_Frame(args)
**
************************************************************************/
public Window_IDEA_Frame addWindow_IDEA_Frame(S_Expr args)
{
  String key = args.getFirst();
  String title = args.getNext();
  String classification = args.getNext();
  Window_IDEA_Frame frame =
        new Window_IDEA_Frame(idea, title, classification, true);
  addComponent(null, frame, key);

Tracer.trace("addWindow_IDEA_Frame", "key: " + key + "; frame: " + frame);
  while(!args.isEmpty())
  {
    S_Expr arg = new S_Expr(this, args.getNext());
    int command = arg.getCommand();
    Assert.prompt(errorTextArea, command != Guiscript.NO_COMMAND,
            "unrecognized command " + arg.getPrevCommand());
    ProcessMsg(frame, command, arg);
  }
  return frame;
} // end addWindow_IDEA_Frame()

/************************************************************************
**
** addWindow(args)
**
************************************************************************/
public Window addWindow(Frame parent, S_Expr args)
{
  String key = args.getFirst();
  Window window = new Window(parent);
  addComponent(parent, window, key);

Tracer.trace("addWindow", "key: " + key + "; window: " + window);
  while(!args.isEmpty())
  {
    S_Expr arg = new S_Expr(this, args.getNext());
    int command = arg.getCommand();
    Assert.prompt(errorTextArea, command != Guiscript.NO_COMMAND,
            "unrecognized command " + arg.getPrevCommand());
    ProcessMsg(window, command, arg);
  }
  return window;
} // end addWindow()

/************************************************************************
**
** addMenu()
**
************************************************************************/
public Menu addMenu(Frame parent, MenuBar menubar, S_Expr args)
```

```
{
  String key = args.getFirst();
  String title = args.getNext();
  Dimension d = parent.size();

Menu menu = new Menu(title);
  menubar.add(menu);
  idea.Register(menu, idea.makeObjectKey((Container)parent, key));

while (!args.isEmpty())
  {
    // get the command
    S_Expr arg = new S_Expr(this, args.getNext());
    int command = arg.getCommand();
    switch (command)
    {
    case Guiscript.DISABLE:
      menu.disable();
      parent.resize(d.width-1, d.height-1);
      parent.resize(d.width, d.height);
      break;

case Guiscript.ENABLE:
      menu.enable();
      parent.resize(d.width-1, d.height-1);
      parent.resize(d.width, d.height);
      break;

case Guiscript.SET_HELP_MENU:
      menubar.setHelpMenu(menu);
      break;

case Guiscript.SET_TEXT:
      menubar.setHelpMenu(menu);
      break;

default:
      addMenuItem(menu, command, arg);
    }
  }
  return menu;
} // end addMenu()

/************************************************************************
**
** addMenuItem()
**
************************************************************************/
public void addMenuItem(Menu menu, int command, S_Expr args)
{
  String key;
  String title;

switch (command)
  {
```

```
    case Guiscript.ADD_CHECKBOX_MENU_ITEM:
    key = args.getFirst();
    title = args.getNext();
    CheckboxMenuItem checkboxmenuitem = new CheckboxMenuItem(title);
    menu.add(checkboxmenuitem);
    key = idea.makeObjectKey(menu, key);
    idea.Register(checkboxmenuitem, key);
    while (!args.isEmpty())
       ProcessCheckboxAction(checkboxmenuitem, new S_Expr(this, args.getNext()));
    break;

case Guiscript.ADD_MENU:
    key = args.getFirst();
    title = args.getNext();
    Menu submenu = new Menu(title);
    menu.add(submenu);
    idea.Register(submenu, idea.makeObjectKey(menu, key));
    Tracer.trace("addMenuItem_ADD_MENU", "parent menu = " + menu);
    while (!args.isEmpty())
    {
       S_Expr msg = new S_Expr(this, args.getNext());
       command = msg.getCommand();
       addMenuItem(submenu, command, msg);
    }
    break;

case Guiscript.ADD_MENU_ITEM:
    key = args.getFirst();
    title = args.getNext();
    MenuItem menuitem = new MenuItem(title);
    menu.add(menuitem);
    key = idea.makeObjectKey(menu, key);
    idea.Register(menuitem, key);
    idea.StoreEventActions(menuitem, Event.ACTION_EVENT, args);
    break;

case Guiscript.ADD_MENU_ITEM_SEPARATOR:
    key = args.getFirst();
    MenuItem separator = new MenuItem("-");
    menu.add(separator);
    idea.Register(separator, idea.makeObjectKey(menu, key));
    break;

default:
    ProcessMsg((MenuItem)menu, command, args);
  } // end switch
} // end addMenuItem()

/*********************************************************************
**
** ProcessCheckboxAction(checkboxmenuitem, args)
**
*********************************************************************/
void ProcessCheckboxAction(CheckboxMenuItem cbmi, S_Expr args)
{
```

```
  String eventstr = args.getFirst();
  Assert.prompt(errorTextArea, eventstr.equals("CHECKBOX_OFF") ||
                eventstr.equals("CHECKBOX_ON"),
          "Invalid CheckboxMenuItem event " + eventstr);
  idea.StoreEventActions(cbmi, Guiscript.eventID(eventstr), args);
} // end ProcessCheckboxAction()

/************************************************************************
**
** addComponent(parent, component, keyName)
**
************************************************************************/
void addComponent(Container parent, Component component, String keyName)
{
  String key = idea.makeObjectKey(parent, keyName);
  idea.Register(component, key);
  if (parent != null)
    parent.add(component);
} // end addComponent()

/************************************************************************
**
** addDialog(args)
**
************************************************************************/
public Dialog addDialog(Frame parent, S_Expr args)
{
  String key = args.getFirst();
  String title = args.getNext();
  boolean modal = (args.getNext().equals("true"));
  Dialog dialog = new Dialog(parent, title, modal);
  addComponent(parent, dialog, key);
  while(!args.isEmpty())
  {
    S_Expr arg = new S_Expr(this, args.getNext());
    int command = arg.getCommand();
    Assert.prompt(errorTextArea, command != Guiscript.NO_COMMAND,
            "unrecognized command " + arg.getPrevCommand());
    ProcessMsg(dialog, command, arg);
  }
  return dialog;
} // end addDialog()

/************************************************************************
**
** addPanel(args)
**
************************************************************************/
public Panel addPanel(Container parent, S_Expr args)
{
  Panel panel = new Panel();
  addComponent(parent, panel, args.getFirst());
  while(!args.isEmpty())
  {
    S_Expr arg = new S_Expr(this, args.getNext());
```

```
      int command = arg.getCommand();
      Assert.prompt(errorTextArea, command != Guiscript.NO_COMMAND,
             "unrecognized command " + arg.getPrevCommand());
      ProcessMsg(panel, command, arg);
    }
    return panel;
  } // end addPanel()

/****************************************************************
  **
  ** addScrollerPanel(args)
  **
  ****************************************************************/
  public ScrollerPanel addScrollerPanel(Container parent, S_Expr args)
  {
    ScrollerPanel sp = new ScrollerPanel();
    addComponent(parent, sp, args.getFirst());
    while(!args.isEmpty())
    {
      S_Expr arg = new S_Expr(this, args.getNext());
      int command = arg.getCommand();
      Assert.prompt(errorTextArea, command != Guiscript.NO_COMMAND,
             "unrecognized command " + arg.getPrevCommand());
      ProcessMsg((Panel) sp, command, arg);
    }
    return sp;
  } // end addScrollerPanel()

/****************************************************************
  **
  ** addView3D(args) -
  **
  ** ( addView3D KEY_NAME PANEL_ARG* )
  **
  ****************************************************************/
  public View3D addView3D(Container parent, S_Expr args)
  {
    String key = args.getFirst();
    String title = args.getNext();
    String addControlsStr = args.getNext();
    boolean addControls = !addControlsStr.equals("false");
    View3D view3d = new View3D(title);
    if (addControls)
      view3d.addControls();
//    view3d.add(new WorldBase(Color.white, 5, 300, 29));
    addComponent(parent, view3d, key);
    view3d.reset();

while(!args.isEmpty())
    {
      S_Expr arg = new S_Expr(this, args.getNext());
      int command = arg.getCommand();
      Assert.prompt(errorTextArea, command != Guiscript.NO_COMMAND,
             "unrecognized command " + arg.getPrevCommand());
      ProcessMsg(view3d, command, arg);
```

```
  }
  return view3d;
} // end addView3D()

/************************************************************************
**
** addButton(args)
**
************************************************************************/
public Button addButton(Container parent, S_Expr args)
{
  String key = args.getFirst();
  String title = args.getNext();
  Button button = new Button(title);
  addComponent(parent, button, key);
  while(!args.isEmpty())
  {
    S_Expr arg = new S_Expr(this, args.getNext());
    int command = arg.getCommand();
    Assert.prompt(errorTextArea, command != Guiscript.NO_COMMAND,
            "unrecognized command " + arg.getPrevCommand());
    ProcessMsg(button, command, arg);
  }
  return button;
} // end addButton()

/************************************************************************
**
** addCheckbox(args)
**
************************************************************************/
public Checkbox addCheckbox(Container parent, S_Expr args)
{
  String key = args.getFirst();
  String title = args.getNext();
  Checkbox checkbox = new Checkbox(title);
  addComponent(parent, checkbox, key);
  while(!args.isEmpty())
  {
    S_Expr arg = new S_Expr(this, args.getNext());
    int command = arg.getCommand();
    Assert.prompt(errorTextArea, command != Guiscript.NO_COMMAND,
            "unrecognized command " + arg.getPrevCommand());
    ProcessMsg(checkbox, command, arg);
  }
  return checkbox;
} // end addCheckbox()

/************************************************************************
**
** addCheckbox(args) -
**
** this checkbox is a radio-button
**
************************************************************************/
```

```
public Checkbox addCheckbox(Container parent, CheckboxGroup group,
                            S_Expr args)
{
  String key = args.getFirst();
  String title = args.getNext();
  Checkbox checkbox = new Checkbox(title);
  parent.add(checkbox);
  String groupstr = idea.getKey(group);
  Assert.prompt(errorTextArea, groupstr != null && !(groupstr.equals("null")),
          "CheckboxGroup " + group + " is not registered");
  idea.Register(checkbox, idea.makeObjectKey(group, key));
  while(!args.isEmpty())
  {
    S_Expr arg = new S_Expr(this, args.getNext());
    int command = arg.getCommand();
    Assert.prompt(errorTextArea, command != Guiscript.NO_COMMAND,
            "unrecognized command " + arg.getPrevCommand());
    ProcessMsg(checkbox, command, arg);
  }
  return checkbox;
} // end addCheckbox()

/***********************************************************************
**
** addLabel(args)
**
***********************************************************************/
public Label addLabel(Container parent, S_Expr args)
{
  String key = args.getFirst();
  String title = args.getNext();
  Label label = new Label(title);
  addComponent(parent, label, key);
  while(!args.isEmpty())
  {
    S_Expr arg = new S_Expr(this, args.getNext());
    int command = arg.getCommand();
    Assert.prompt(errorTextArea, command != Guiscript.NO_COMMAND,
            "unrecognized command " + arg.getPrevCommand());
    ProcessMsg(label, command, arg);
  }
  return label;
} // end addLabel()

/***********************************************************************
**
** addCanvas(args)
**
***********************************************************************/
public Canvas addCanvas(Container parent, S_Expr args)
{
  Canvas canvas = new Canvas();
  addComponent(parent, canvas, args.getFirst());
  while(!args.isEmpty())
  {
```

```
    S_Expr arg = new S_Expr(this, args.getNext());
    int command = arg.getCommand();
    Assert.prompt(errorTextArea, command != Guiscript.NO_COMMAND,
              "unrecognized command " + arg.getPrevCommand());
    ProcessMsg(canvas, command, arg);
  }
  return canvas;
} // end addCanvas()

/************************************************************************
**
** addImage(parent, args)
**
** SYNTAX: ( addImage KEY_NAME IMAGE_FILENAME CANVAS_ARG* )
**
************************************************************************/
public ImageComponent addImage(Container parent, S_Expr args)
{

String keyName = args.getFirst();
  String fileName = args.getNext();
/*   Image image = Toolkit.getDefaultToolkit().getImage(fileName); */
  Image image = idea.getImage(idea.getCodeBase(), fileName);
  ImageComponent imagecomponent = new ImageComponent(image);
  addComponent(parent, imagecomponent, keyName);
  while(!args.isEmpty())
  {
    S_Expr arg = new S_Expr(this, args.getNext());
    int command = arg.getCommand();
    Assert.prompt(errorTextArea, command != Guiscript.NO_COMMAND,
              "unrecognized command " + arg.getPrevCommand());
    ProcessMsg(imagecomponent, command, arg);
  }
  return imagecomponent;
} // end addImage()

/************************************************************************
**
** addCheckboxGroup(args)
**
************************************************************************/
public CheckboxGroup addCheckboxGroup(Container parent, S_Expr args)
{
  String key = args.getFirst();
  CheckboxGroup checkboxgroup = new CheckboxGroup();
  idea.Register(checkboxgroup, idea.makeObjectKey(parent, key));
  while(!args.isEmpty())
  {
    S_Expr arg = new S_Expr(this, args.getNext());
    int command = arg.getCommand();
    Assert.prompt(errorTextArea, command != Guiscript.NO_COMMAND,
              "unrecognized command " + arg.getPrevCommand());
    ProcessMsg(checkboxgroup, command, arg);
  }
  return checkboxgroup;
```

```
} // end addCheckboxGroup()

/************************************************************************
**
** addChoice(args)
**
************************************************************************/
public Choice addChoice(Container parent, S_Expr args)
{
  Tracer.trace("addChoice", "args: " + args);
  Choice choice = new Choice();
  addComponent(parent, choice, args.getFirst());

String titles = args.getNext();
  StringTokenizer t = new StringTokenizer(titles,"\r\n/",false);
  while (t.hasMoreElements())
  {
    String token = t.nextToken();
    choice.addItem(token);
  }
  choice.select(0);

while(!args.isEmpty())
  {
    S_Expr arg = new S_Expr(this, args.getNext());
    int command = arg.getCommand();
    Assert.prompt(errorTextArea, command != Guiscript.NO_COMMAND,
            "unrecognized command " + arg.getPrevCommand());
    ProcessMsg(choice, command, arg);
  }
  return choice;
} // end addChoice()

/************************************************************************
**
** addComponent(key, component) -
**
** for "external" components only
**
************************************************************************/
public void addComponent(String key, Component component)
{
  idea.Register(component, key);
}

/************************************************************************
**
** addObject(key, object) -
**
** for non-component objects only
**
************************************************************************/
public void addObject(String key, Object object)
{
  idea.Register(object, key);
```

```
}

/************************************************************************
**
** addMultiState_Button(args)
**
************************************************************************/
public void addMultiState_Button(Container parent, S_Expr args)
{
  MultiState_Button ms_button = new MultiState_Button();
  addComponent(parent, ms_button, args.getFirst());

String titles = args.getNext();
  StringTokenizer t = new StringTokenizer(titles,"\r\n/",false);
  while (t.hasMoreElements())
    ms_button.addItem(t.nextToken());
  ms_button.select(0);

while(!args.isEmpty())
  {
    S_Expr arg = new S_Expr(this, args.getNext());
    int command = arg.getCommand();
    Assert.prompt(errorTextArea, command != Guiscript.NO_COMMAND,
            "unrecognized command " + arg.getPrevCommand());
    ProcessMsg(ms_button, command, arg);
  }
} // end addMultiState_Button()

/************************************************************************
**
** addList(args)
**
************************************************************************/
public void addList(Container parent, S_Expr args)
{
  List list = new List();
  addComponent(parent, list, args.getFirst());
  while(!args.isEmpty())
  {
    S_Expr arg = new S_Expr(this, args.getNext());
    int command = arg.getCommand();
    Assert.prompt(errorTextArea, command != Guiscript.NO_COMMAND,
            "unrecognized command " + arg.getPrevCommand());
    ProcessMsg(list, command, arg);
  }
} // end addList()

/************************************************************************
**
** addSeparator(args)
**
************************************************************************/
public void addSeparator(Container parent, S_Expr args)
{
  Separator separator = new Separator();
```

```
    addComponent(parent, separator, args.getFirst());
    while(!args.isEmpty())
    {
      S_Expr arg = new S_Expr(this, args.getNext());
      int command = arg.getCommand();
      Assert.prompt(errorTextArea, command != Guiscript.NO_COMMAND,
                "unrecognized command " + arg.getPrevCommand());
      ProcessMsg(separator, command, arg);
    }
  } // end addSeparator()

/************************************************************************
  **
  ** addTextArea(msg)
  **
  ************************************************************************/
  public void addTextArea(Container parent, S_Expr args)
  {
    String key = args.getFirst();
    int rows = args.getint();
    int cols = args.getint();
    TextArea textarea = new TextArea(rows, cols);
    addComponent(parent, textarea, key);
    while(!args.isEmpty())
    {
      S_Expr arg = new S_Expr(this, args.getNext());
      int command = arg.getCommand();
      Assert.prompt(errorTextArea, command != Guiscript.NO_COMMAND,
                "unrecognized command " + arg.getPrevCommand());
      ProcessMsg(textarea, command, arg);
    }
  } // end addTextArea()

/************************************************************************
  **
  ** addErrorDisplay(msg)
  **
  ************************************************************************/
  public void addErrorDisplay(Container parent, S_Expr args)
  {
    String key = args.getFirst();
    int rows = args.getint();
    int cols = args.getint();
    TextArea errorDisplay = makeErrorTextArea(rows, cols);
    if (errorDisplay == null) // it's already been created
      return;
    addComponent(parent, errorDisplay, key);
    while(!args.isEmpty())
    {
      S_Expr arg = new S_Expr(this, args.getNext());
      int command = arg.getCommand();
      Assert.prompt(errorTextArea, command != Guiscript.NO_COMMAND,
                "unrecognized command " + arg.getPrevCommand());
      ProcessMsg(errorDisplay, command, arg);
    }
```

```
} // end addErrorDisplay()

/***********************************************************************
**
** addTextField(args)
**
***********************************************************************/
public void addTextField(Container parent, S_Expr args)
{
  TextField textfield = new TextField();
  addComponent(parent, textfield, args.getFirst());
  while(!args.isEmpty())
  {
    S_Expr arg = new S_Expr(this, args.getNext());
    int command = arg.getCommand();
    Assert.prompt(errorTextArea, command != Guiscript.NO_COMMAND,
              "unrecognized command " + arg.getPrevCommand());
    ProcessMsg(textfield, command, arg);
  }
} // end addTextField()

/***********************************************************************
**
** addScrollbar(args)
**
***********************************************************************/
public void addScrollbar(Container parent, S_Expr args)
{
  Scrollbar scrollbar = null;
  String key = args.getFirst();
  String orientation = args.getNext();

if (orientation.equals("HORIZONTAL"))
    scrollbar = new Scrollbar(Scrollbar.HORIZONTAL);
  else if (orientation.equals("VERTICAL"))
    scrollbar = new Scrollbar(Scrollbar.VERTICAL);
  else
    Assert.prompt(errorTextArea, false, "invalid orientation " + orientation);
  addComponent(parent, scrollbar, key);

while(!args.isEmpty())
  {
    S_Expr arg = new S_Expr(this, args.getNext());
    int command = arg.getCommand();
    Assert.prompt(errorTextArea, command != Guiscript.NO_COMMAND,
              "unrecognized command " + arg.getPrevCommand());
    ProcessMsg(scrollbar, command, arg);
  }
} // end addScrollbar()

/***********************************************************************
**
** ProcessDrawMsg(view3d, args)
**
```

```
*******************************************************************/
void ProcessDrawMsg(View3D view3d, S_Expr sep)
{
   ProcessDrawMsg(view3d._cpanel, sep);
} // end ProcessDrawMsg(View3D)

/*******************************************************************
**
** ProcessDrawMsg(window_canvaspanel, args)
**
*******************************************************************/
void ProcessDrawMsg(Window_CanvasPanel window_canvaspanel, S_Expr sep)
{
   float minht=-1.0f, maxht=-1.0f;

String keyName = sep.getFirst();
   String regionTypeStr = sep.getNext();
   int regionType = Guiscript.getCmdID(regionTypeStr);
//    Assert.prompt(errorTextArea, regionType == SPHERIC || regionType == CYLINDRIC,
//             "invalid region type " + regionTypeStr);
   if (regionType == Guiscript.NO_COMMAND)
      regionType = Guiscript.SPHERIC;
   int minbrg = sep.getint();
   int maxbrg = sep.getint();
   float minrng = sep.getfloat();
   float maxrng = sep.getfloat();
   minht = sep.getfloat();
   maxht = sep.getfloat();
   Tracer.trace2("ProcessDrawMsg", "bearings: (" + minbrg + "," + maxbrg +
                          "), ranges: (" + minrng + "," + maxrng +
                          "), verts: (" + minht + "," + maxht + ")");
   Color color = makeColor(sep);
   String drawstyle = sep.getNext();

if (regionType == Guiscript.CYLINDRIC)
      window_canvaspanel.drawCylindric(keyName, minbrg, maxbrg, minrng, maxrng,
                             minht, maxht, color, drawstyle);
   else if (regionType == Guiscript.SPHERIC)
      window_canvaspanel.drawSpheric(keyName, minbrg, maxbrg, minrng, maxrng,
                          minht, maxht, color, drawstyle);
} // end ProcessDrawMsg()

/*******************************************************************
**
** ProcessDrawAtMsg(view3d, args)
**
*******************************************************************/
void ProcessDrawAtMsg(View3D view3d, S_Expr sep)
{
   ProcessDrawAtMsg(view3d._cpanel, sep);
} // end ProcessDrawAtMsg(View3D)

/*******************************************************************
```

```
/******************************************************************
**
** ProcessDrawAtMsg(window_canvaspanel, args)
**
******************************************************************/
void ProcessDrawAtMsg(Window_CanvasPanel window_canvaspanel, S_Expr sep)
{
  float minht=-1.0f, maxht=-1.0f;

String keyName = sep.getFirst();
  String regionTypeStr = sep.getNext();
  int regionType = Guiscript.getCmdID(regionTypeStr);
  Assert.prompt(errorTextArea,
            regionType == Guiscript.SPHERIC ||
            regionType == Guiscript.CYLINDRIC,
            "invalid region type " + regionTypeStr);
  int minbrg = sep.getint();
  int maxbrg = sep.getint();
  float minrng = sep.getfloat();
  float maxrng = sep.getfloat();
  minht = sep.getfloat();
  maxht = sep.getfloat();
  Tracer.trace2("ProcessDrawAtMsg", "bearings: (" + minbrg + "," + maxbrg +
                       "), ranges: (" + minrng + "," + maxrng +
                       "), verts: (" + minht + "," + maxht + ")");
  Color color = makeColor(sep);
  String drawstyle = sep.getNext();

Vertex at = new Vertex(sep.getfloat(), sep.getfloat(), sep.getfloat());

if (regionType == Guiscript.CYLINDRIC)
    window_canvaspanel.drawCylindric(keyName, minbrg, maxbrg, minrng, maxrng,
                        minht, maxht, color, drawstyle, at);
  else if (regionType == Guiscript.SPHERIC)
    window_canvaspanel.drawSpheric(keyName, minbrg, maxbrg, minrng, maxrng,
                        minht, maxht, color, drawstyle, at);
} // end ProcessDrawAtMsg()

/******************************************************************
**
** ProcessDrawSurfaceMsg(view3d, sep)
**
******************************************************************/
void ProcessDrawSurfaceMsg(View3D view3d, S_Expr sep)
{
  ProcessDrawSurfaceMsg(view3d._cpanel, sep);
} // end ProcessDrawSurfaceMsg(View3D)

/******************************************************************
**
** ProcessDrawSurfaceMsg(window_canvaspanel, sep)
**
** syntax: KEY_NAME SURFACE_ARG* )
** SURFACE_ARG ::=
```

```
**          COLOR
**          FACE
** COLOR ::==
**          ( color COLOR_NAME )
**          ( color INTEGER INTEGER INTEGER ) // red, green, blue
** FACE ::== ( face VERTEX* )
** VERTEX ::== NUMBER NUMBER NUMBER // x, y, z
**
***********************************************************************/
void ProcessDrawSurfaceMsg(Window_CanvasPanel window_canvaspanel,
                           S_Expr sep)
{
  String keyName = sep.getFirst();
  Color color = Color.black;
  Vector faces = new Vector();
  Vector vertices;

while (!sep.isEmpty())
  {
    S_Expr arg = new S_Expr(this, sep.getNext());
    String command = arg.getFirst();
    if (command.equals("color"))
      color = makeColor(arg);
    else if (command.equals("face"))
    {
    vertices = new Vector();
    while (!arg.isEmpty())
      vertices.addElement(new Vertex(arg.getfloat(), -arg.getfloat(),
                          -arg.getfloat()));
    faces.addElement(Surface.makeFace(color, vertices));
    }
    else
    Assert.prompt(errorTextArea, false, "invalid command " + command);
  }

Surface surface = new Surface(keyName, faces);
  window_canvaspanel.drawSurface(keyName, surface);
} // end ProcessDrawSurfaceMsg()

/***********************************************************************
**
** ProcessEraseMsg(view3d, sep)
**
***********************************************************************/
void ProcessEraseMsg(View3D view3d, S_Expr sep)
{
  view3d._cpanel.eraseM(sep.getFirst());
} // end ProcessEraseMsg(View3D)

/***********************************************************************
**
** ProcessEraseMsg(window_canvaspanel, sep)
**
```

```
***********************************************************************/
void ProcessEraseMsg(Window_CanvasPanel window_canvaspanel, S_Expr sep)
{
  window_canvaspanel.eraseM(sep.getFirst());
} // end ProcessEraseMsg()

/**********************************************************************
**
** ProcessGraphicsMsg(view3d, command, msg)
**
***********************************************************************/
boolean ProcessGraphicsMsg(View3D view3d, int command, S_Expr msg)
{
  switch (command)
  {
    case Guiscript.HIDE:
    view3d.hide();
    break;

case Guiscript.RESET:
    view3d.reset();
    break;

case Guiscript.SHOW:
    view3d.show();
    break;

default:
    return ProcessGraphicsMsg(view3d._cpanel, command, msg);
  }
  return true;
} // end ProcessGraphicsMsg(View3D)

/**********************************************************************
**
** ProcessGraphicsMsg(wcp, command, msg)
**
***********************************************************************/
boolean ProcessGraphicsMsg(Window_CanvasPanel wcp, int command, S_Expr msg)
{
  switch (command)
  {
    case Guiscript.DRAW:
    ProcessDrawMsg(wcp, msg);
    break;

case Guiscript.DRAW_AT:
    ProcessDrawAtMsg(wcp, msg);
    break;

case Guiscript.DRAW_SURFACE:
    ProcessDrawSurfaceMsg(wcp, msg);
    break;
```

```
    case Guiscript.ERASE:
    ProcessEraseMsg(wcp, msg);
    break;

case Guiscript.HIDE:
    case Guiscript.HIDE_MODEL:
    wcp.hideModel(msg.getFirst());
    break;

case Guiscript.HIDE_TRACER:
    Tracer.Hide();
    break;

case Guiscript.RESCALE:
    wcp.reScale();
    break;

case Guiscript.RESET:
    wcp.reset();
    break;

case Guiscript.SHOW:
    case Guiscript.SHOW_MODEL:
    wcp.showModel(msg.getFirst());
    break;

case Guiscript.SHOW_TRACER:
    Tracer.Show();
    break;

default:
    return false;
  }
  return true;
} // end ProcessGraphicsMsg()

/***********************************************************************
**
** ProcessGraphicsMsgs(sep)
**
***********************************************************************/
void ProcessGraphicsMsgs(S_Expr sep)
{
  String panelstr = sep.getFirst();
  Panel panel = (Panel)idea.Lookup(panelstr);
  Assert.fail(errorTextArea, panel != null, panelstr + " not in idea");
  Tracer.trace2("ProcessGraphicsMsgs", "Panel name: " + panelstr +
           "\n\tPanel: " + panel + "\n\tS_Expr: " + sep);

while(!sep.isEmpty())
  {
    S_Expr msg = new S_Expr(this, sep.getNext());
    int command = msg.getCommand();
    Assert.prompt(errorTextArea, command != Guiscript.NO_COMMAND,
```

```
            "unrecognized command " + msg.getPrevCommand());
      if (panel instanceof Window_CanvasPanel)
      ProcessGraphicsMsg((Window_CanvasPanel)panel, command, msg);
      else if (panel instanceof View3D)
      ProcessGraphicsMsg((View3D)panel, command, msg);
   }
} // end ProcessGraphicsMsgs()

/************************************************************************
**
** ProcessMsg(msg, hashcode) - Receiver implementation
**
************************************************************************/
public boolean ProcessMsg(byte[] msg, int hashCode)
{
   return ProcessMsg(new String(msg, 0), hashCode);
} // end ProcessMsg(byte[] msg, hashcode)

/************************************************************************
**
** ProcessMsg(msg, hashcode)
**
************************************************************************/
public boolean ProcessMsg(String msg, int hashCode)
{
   Tracer.trace("ClientInterpreter.ProcessMsg", "msg = [" + msg + "]");
   try
   {
      S_Expr sep = new S_Expr(this, msg);
      int command = sep.getCommand();
      if (command == Guiscript.NO_COMMAND)
      return false;
      ProcessMsg(command, sep);
   }
   catch (IllegalArgumentException iae)
   {
      if (!ProcessNonGuiscriptMsg(msg, hashCode))
      Assert.prompt(errorTextArea, iae, " from node " + hashCode);
   }
   return true;
} // end ProcessMsg(String msg, hashcode)

/************************************************************************
**
** ProcessMsg(command, msg)
**
************************************************************************/
void ProcessMsg(int command, S_Expr msg)
{
   Tracer.trace("ProcessMsg", "command: " + Guiscript.getCmdStr(command));
   Tracer.trace("ProcessMsg.msg", "msg:\n[" + msg.toString(1024) + "]");
   String msgstr;
```

```
switch (command)
{
  case Guiscript.ADD_WINDOW_IDEA_FRAME:
  addWindow_IDEA_Frame(msg);
  break;

case Guiscript.CLIENT_YOU_ARE:
//  String clientID = msg.getNext();
//  idea.setClientID(clientID);
  String password = idea.login(msg);
  msgstr = JessTFax.startMessage("init");
  if (password != null)
    msgstr = JessTFax.addSlot(msgstr, "login", password);
  idea.sendToJess(msgNum, msgstr);
  msgNum++;
  break;

case Guiscript.EXEC:
  if (!idea.isAnApplication()) break;
  Runtime runtime = Runtime.getRuntime();
  Assert.check(errorTextArea, runtime != null, "could not get the Runtime");
  String execCmd = "";
  while (!msg.isEmpty())
    execCmd += msg.getNext();
  try
  {
    Tracer.trace("ProcessMsg.exec", "exec message:\n[" + execCmd + "]");
    runtime.exec(execCmd);
  }
  catch (IOException ie)
  {
    Assert.check(errorTextArea, ie, "could not execute " + execCmd);
  }
  break;

case Guiscript.EXIT:
  idea.exit(0);
  break;

case Guiscript.GET_AUDIO_CLIP:
  GetAudioClip(msg);
  break;

case Guiscript.GET_FILE:
  GetFile(msg);
  break;

case Guiscript.GRAPHICS:
  ProcessGraphicsMsgs(msg);
  break;

case Guiscript.GUISCRIPT:
  while (!msg.isEmpty())
  {
    S_Expr expr = new S_Expr(this, msg.getNext());
```

```
    Tracer.trace("ClientInterpreter.ProcessMsg",
            "expr:\n" + expr.toString(1024));
    int cmd = expr.getCommand();
    Assert.prompt(errorTextArea, cmd != Guiscript.NO_COMMAND,
            "unrecognized command " + expr.getPrevCommand());
    ProcessMsg(cmd, expr);
}
break;

case Guiscript.HIDE_TRACER:
Tracer.Hide();
break;

case Guiscript.LET:
ProcessLetCommand(msg);
break;

case Guiscript.LOOP_AUDIO_CLIP:
LoopAudioClip(msg);
break;

case Guiscript.STORE_MACRO:
storeMacro(msg);
break;

case Guiscript.MODIFY:  // a command from the Jess server
ProcessModify(msg);
break;

case Guiscript.NEW_MOVIE_SCRIPT:
newMovieScript(msg);
break;

case Guiscript.NEW_CHATBOX:
newChatBox(msg);
break;

case Guiscript.NEW_FRAME:
newFrame(msg);
break;

case Guiscript.NEW_PINGBOX:
newPingBox(msg);
break;

case Guiscript.NO_COMMAND:
break;

case Guiscript.ON_RECEIPT:  // a non-guiscript message or command from
                            // the server
onReceipt(msg);
break;

case Guiscript.ON_RECEIPT_OF_GARBAGE:  // an unrecognizable non-guiscript
                            // message or command from the server
```

```
onReceiptOfGarbage(msg);
break;

case Guiscript.PING:
PingBox pingBox = (PingBox)idea.Lookup("pingBox");
if (pingBox != null)
{
  msgstr = msg.toString();
  byte[] b = new byte[msgstr.length()];
  msgstr.getBytes(0, msgstr.length(), b, 0);
  pingBox.pingServer(b);
}
break;

case Guiscript.PAUSE:
ProcessSleepMsg(Guiscript.PAUSE, Thread.currentThread(), msg);
break;

case Guiscript.PLAY_AUDIO_CLIP:
PlayAudioClip(msg);
break;

case Guiscript.PLAY_MOVIE_SCRIPT:
playMovieScript(msg.getFirst());
break;

case Guiscript.PLAY_SCRIPT:
PlayScript(msg);
break;

case Guiscript.PRINT:
PrintArgs(msg);
break;

case Guiscript.REPORT:
idea.sendToJess(msgNum, CollectData(msg));
msgNum++;
break;

case Guiscript.SEND:
msgstr = "";
while (!msg.isEmpty())
  msgstr += msg.getNext();
Tracer.trace("ClientInterpreter.ProcessMsg(send)", "msg = [" + msgstr + "]");
idea.send(msgNum, msgstr);
msgNum++;
break;

case Guiscript.SET_DOUBLE_CLICK_SPEED:
idea.doubleClickSpeed = msg.getint();
break;

case Guiscript.SHOW_DOCUMENT:
showDocument(msg);
break;
```

```
    case Guiscript.SHOW_TRACER:
    Tracer.Show();
    break;

case Guiscript.SLEEP:
    ProcessSleepMsg(Guiscript.SLEEP, Thread.currentThread(), msg);
    break;

case Guiscript.STOP_AUDIO_CLIP:
    StopAudioClip(msg);
    break;

case Guiscript.STORE:
    idea.store(msg);
    break;

case Guiscript.STORE_SCRIPT:
    storeScript(msg);
    break;

default:
    break;
  } // end switch
} // end ProcessMsg(command, msg)

protected Hashtable Macros = null; // place to hold all the macro definitions

/************************************************************************
**
** getMacro()
**
************************************************************************/
public Vector getMacro(String macroName)
{
  Vector v;
  if (Macros == null || (v = (Vector)(Macros.get(macroName))) == null)
    return null;
  return v;
} // getMacro()

/************************************************************************
**
** storeMacro(sep) -
**
** syntax: (storeMacro KEY (PARAMETER*) ACTION*)
**
** storeMacro(sep) stores the macro definition in a hashtable, keyed on KEY,
** a normal keyname.
**
** To invoke a macro, use this syntax:
** [KEY ARG ARG ... ]
** where each ARG replaces all instances of the corresponding PARAMETER in
** the ACTIONs of the storeMacro definition.
**
```

```
**********************************************************************/
public void storeMacro(S_Expr sep)
{
  String key = sep.getFirst();
  Tracer.trace("storeMacro", "key = " + key + "; sep = " + sep.toString());
  Vector v = sep.prepMacro();
  if (Macros == null)
    Macros = new Hashtable();
  Macros.put(key, v);
} // end storeMacro()

protected Hashtable ngmActions = null; // non-guiscript message actions

/*********************************************************************
**
** onReceipt(sep) -
**
** syntax: (onReceipt KEY ACTION*)
**
** onReceipt(sep) stores the ACTIONS in a hashtable, keyed on KEY (a string
** to key on from the server). The KEY must not begin with a "(" and it
** must be the first "word" in the server's message.
**
**********************************************************************/
public void onReceipt(S_Expr sep)
{
  Tracer.trace("ClientInterpreter.onReceipt", "message =\n[" + sep + "]");
  if (ngmActions == null)
    ngmActions = new Hashtable();
  String key = sep.getFirst();
  ngmActions.put(key, sep);
} // end onReceipt()

protected S_Expr garbageActions = null; // "garbage" message actions
protected String garbageMessage = null; // place to store invalid
                                        // non-guiscript message /*********************************************************************
**
** onReceiptOfGarbage(sep) -
**
** syntax: (onReceiptOfGarbage ACTION*)
**
** onReceipt(sep) stores the ACTIONS in garbageActions. If an invalid or
** unrecognized non-guiscript command is received, the ACTIONs are executed
** instead of displaying an Assert message.
**
**********************************************************************/
public void onReceiptOfGarbage(S_Expr sep)
{
  Tracer.trace("ClientInterpreter.onReceiptOfGarbage",
           "message =\n[" + sep + "]");
  garbageActions = sep;
```

```
} // end onReceiptOfGarbage()

/*************************************************************************
**
** skipBlanks(msg, offset) -
**
** returns the index of the next non-whitespace character in msg beginning
** at msg[offset]
**
**************************************************************************/
int skipBlanks(String msg, int offset)
{
  while(offset < msg.length() && Character.isSpace(msg.charAt(offset)))
    offset++;
  return offset;
} // end skipBlanks()

/*************************************************************************
**
** skipNonBlanks(msg, offset) -
**
** returns the index of the next whitespace character in msg beginning
** at msg[offset]
**
**************************************************************************/
int skipNonBlanks(String msg, int offset)
{
  while(offset < msg.length() && !(Character.isSpace(msg.charAt(offset))))
    offset++;
  return offset;
} // end skipNonBlanks()

/*************************************************************************
**
** ProcessNonGuiscriptMsg(msg, hashcode) -
**
** This is called when msg is found not to qualify as an S_Expr - that is,
** msg does not begin with a "(".
**
** 1. The msg is converted into a String and its first token is extracted
**    as msgkey.  If the token is not found in the ngmActions hashtable,
**    ProcessNonGuiscriptMsg returns false.
** 2. The ACTIONS put in by onReceipt() (and keyed by msgkey) are copied
**    out of ngmActions into cmds.
** 3. The rest of the msg (after msgkey) is "Registered" (stored in IDEA's
**    component storage hashtable), using msgkey as its key.  Any ACTION
**    can access the msg by invoking idea.Lookup(msgkey), which will return
**    the registered part of the msg.
** 4. In the same way that IDEA.handleEvent() processes events, each ACTION
**    is "peeled off" from the ACTIONS, its first argument extracted as a
**    command, and they are passed to ProcessMsg() which executes the
**    command, using the rest of ACTIONS as arguments.
**
**************************************************************************/
```

```java
public boolean ProcessNonGuiscriptMsg(String msgstr, int hashcode)
{
  Tracer.trace("ClientInterpreter.ProcessNonGuiscriptMsg",
            "msgstr = [" + msgstr + "]");
  int start = skipBlanks(msgstr, 0); // start of msgkey
  int end = skipNonBlanks(msgstr, start); // first space after the end of msgkey
  String msgkey = msgstr.substring(start, end);
  if (ngmActions == null || !ngmActions.containsKey(msgkey))
  {
    garbageMessage = msgstr;
    if (garbageActions != null)
    {
    S_Expr cmds = garbageActions;
    while (!cmds.isEmpty())
    {
      S_Expr action = new S_Expr(this, cmds.getNext());
      int command = action.getCommand();
      ProcessMsg(command, action);
    }
    return true;
    }
    Assert.prompt(errorTextArea, false, "Unrecognized command [" + msgkey +
                        "] from node " + hashcode +
                        "\nin message [" + msgstr + "]");
    return false;
  }

S_Expr sep = (S_Expr)(ngmActions.get(msgkey));
  S_Expr cmds = new S_Expr(this, "(" + sep);
  start = skipBlanks(msgstr, end);
  msgstr = msgstr.substring(start);
  Tracer.trace("ClientInterpreter.ProcessNonGuiscriptMsg",
            "msgstr without " + msgkey + " = [" + msgstr + "]");
  idea.Register(msgstr, msgkey);

while (!cmds.isEmpty())
  {
    S_Expr action = new S_Expr(this, cmds.getNext());
    Tracer.trace("ProcessNonGuiscriptMsg", "action: " + action);
    int command = action.getCommand();
    ProcessMsg(command, action);
  }
  return true;
} // end ProcessNonGuiscriptMsg()

/***********************************************************************
**
** ProcessSleepMsg(command, thread, args)
**
***********************************************************************/
public void ProcessSleepMsg(int command, Thread thread, S_Expr msg)
{
  int millis = msg.getint();
  int nanos = 0;
```

```
   if (command == Guiscript.SLEEP)
   {
     nanos = 0;
     if (!msg.isEmpty())
       nanos = msg.getint();
   }
   else // command == Guiscript.PAUSE
     millis *= 1000;
   try
   {
     thread.sleep(millis, nanos);
   }
   catch (InterruptedException ie) {}
} // end ProcessSleepMsg()

/************************************************************************
**
** ProcessLetCommand(sep)
**
************************************************************************/
public void ProcessLetCommand(S_Expr expr)
{
  String objstr = expr.getFirst();
  Object object = (Object)idea.Lookup(objstr);
  Tracer.trace("ProcessLetCommand",
           "objstr = [" + objstr + "]\nobject = " + object);
  Assert.check(errorTextArea, object != null, objstr + " is not in idea");
  while (!expr.isEmpty())
  {
    S_Expr sep = new S_Expr(this, expr.getNext());
    String cmd = sep.getFirst();
    int cmdint = Guiscript.getCmdID(cmd);
    ProcessMsg(object, cmdint, sep);
  }
} // end ProcessLetCommand()

/************************************************************************
**
** storeScript(sep)
**
************************************************************************/
public void storeScript(S_Expr expr)
{
  String key = expr.getFirst();
  String scriptstr = expr.getNext();
  idea.Register(scriptstr, key);
} // end storeScript()

/************************************************************************
**
** showDocument(sep)
**
```

```
****************************************************************/
public void showDocument(S_Expr expr)
{
  AppletContext browser = idea.getAppletContext();
  String urlName = expr.getFirst();
  URL url = null;
  try
  {
    url = new URL(urlName);
  }
  catch (MalformedURLException mue)
  {
    Assert.prompt(errorTextArea, mue, "could not find URL " + urlName);
    return;
  }
  if (url == null)
    return;
  if (expr.isEmpty())
    browser.showDocument(url);
  else
  {
    String target = expr.getNext();
    browser.showDocument(url, target);
  }
} // end showDocument()

/*****************************************************************
**
** ProcessModify(script) -
**
** guiscript commands from the Jess server
**
** syntax: (target command args) (target command args) ... )
**
****************************************************************/
public void ProcessModify(S_Expr script)
{
  while (!script.isEmpty())
  {
    S_Expr args = new S_Expr(this, script.getNext());
    String objstr = args.getFirst();
    Object object = idea.Lookup(objstr);
    Assert.fail(errorTextArea, object != null, objstr + " is not a registered object");

String index = args.getNext();
    String value = args.getNext();
    if (value.equals("NIL")) value = "";
    Tracer.trace("ProcessModify", object + " " + index + ": " + value);
//      setValue(object, index, value);
    setValue(object, value);
  } // end while
} // end ProcessModify()
```

```
/************************************************************************
**
** ProcessMsg(object, cmd, args)
**
************************************************************************/
public void ProcessMsg(Object object, int cmd, S_Expr args)
{
    if (object instanceof Frame)
    ProcessMsg((Frame)object, cmd, args);
    else if (object instanceof Dialog)
    ProcessMsg((Dialog)object, cmd, args);
    else if (object instanceof Window)
    ProcessMsg((Window)object, cmd, args);
    else if (object instanceof Panel)
    ProcessMsg((Panel)object, cmd, args);

else if (object instanceof MultiState_Button)
    ProcessMsg((MultiState_Button)object, cmd, args);
    else if (object instanceof Button)
    ProcessMsg((Button)object, cmd, args);
    else if (object instanceof Checkbox)
    ProcessMsg((Checkbox)object, cmd, args);
    else if (object instanceof CheckboxGroup)
    ProcessMsg((CheckboxGroup)object, cmd, args);
    else if (object instanceof Choice)
    ProcessMsg((Choice)object, cmd, args);
    else if (object instanceof Label)
    ProcessMsg((Label)object, cmd, args);
    else if (object instanceof List)
    ProcessMsg((List)object, cmd, args);
    else if (object instanceof Scrollbar)
    ProcessMsg((Scrollbar)object, cmd, args);
    else if (object instanceof Separator)
    ProcessMsg((Separator)object, cmd, args);
    else if (object instanceof TextArea)
    ProcessMsg((TextArea)object, cmd, args);
    else if (object instanceof TextField)
    ProcessMsg((TextField)object, cmd, args);
    else if (object instanceof TextComponent)
    ProcessMsg((TextComponent)object, cmd, args);

else if (object instanceof CheckboxMenuItem)
    ProcessMsg((CheckboxMenuItem)object, cmd, args);
    else if (object instanceof Menu)
    ProcessMsg((Menu)object, cmd, args);
    else if (object instanceof MenuItem)
    ProcessMsg((MenuItem)object, cmd, args);

else
    Assert.check(errorTextArea, false, "don't know how to process messages for " +
object);
} // end ProcessMsg()

/************************************************************************
```

```
**
** setValue(target, arguments)
**
***********************************************************************/
void setValue(Object target, String arguments)
{
  Tracer.trace2("setValue", target + ": " + arguments);
  if (target instanceof Button)
  {
    ((Button)target).setLabel(arguments);
  }
  else if (target instanceof Checkbox)
  {
    if (arguments.equals("true"))
    ((Checkbox)target).setState(true);
    else if (arguments.equals("false"))
    ((Checkbox)target).setState(false);
    else
    ((Checkbox)target).setLabel(arguments);
  }
  else if (target instanceof CheckboxMenuItem)
  {
    if (arguments.equals("true"))
    ((CheckboxMenuItem)target).setState(true);
    else if (arguments.equals("false"))
    ((CheckboxMenuItem)target).setState(false);
  }
  else if (target instanceof Choice)
  {
    try
    {
    Integer Pos = new Integer(arguments);
    ((Choice)target).select(Pos.intValue());
    }
    catch (Exception e) {}
  }
  else if (target instanceof Label)
  {
    ((Label)target).setText(arguments);
  }
  else if (target instanceof Scrollbar)
  {
    try
    {
    Integer Pos = new Integer(arguments);
    ((Scrollbar)target).setValue(Pos.intValue());
    }
    catch (Exception e) {}
  }
  else if (target instanceof TextArea)
  {
    ((TextArea)target).setText("");
    ((TextArea)target).appendText(arguments);
  }
  else if (target instanceof TextField)
```

```
      {
        ((TextField)target).setText(arguments);
      }
      else {
        Assert.prompt(errorTextArea, false, "Invalid object: " + target +
                      "encountered in setValue");
        return;
      }
      if (!(target instanceof CheckboxMenuItem))
      {
        Component c = (Component)target;
        Dimension d = c.size();
        c.invalidate();
        c.layout();
        c.resize(d.width-1, d.height-1);
        c.resize(d.width, d.height);
//      c.repaint();
      }
    } // end setValue()

/************************************************************************
    **
    ** YesOrNo(boolean)
    **
    ************************************************************************/
    private String YesOrNo(boolean b)
    {
      if (b) return "yes";
      return "no";
    } // end YesOrNo()

/************************************************************************
    **
    ** getProperty(property)
    **
    ************************************************************************/
    String getProperty(String property, String defaultValue)
    {
      String answer = defaultValue;
      try
      {
        answer = System.getProperty(property);
        if (answer == null)
        {
        if (property.startsWith("client")) // client.name or client.address
        {
          try
          {
            InetAddress clientAddress = InetAddress.getLocalHost();
            if (property.endsWith("name"))
              answer = clientAddress.getHostName();
            else if (property.endsWith("address"))
              answer = clientAddress.toString();
```

```
      if (answer == null)
         answer = defaultValue;
    }
    catch (Exception e1)
    {
      Assert.prompt(errorTextArea, e1, "unrecognized property " + property);
      answer = defaultValue;
    }
  }
  else
    answer = defaultValue;
  }
}
catch (Exception e)
{
  Assert.prompt(errorTextArea, e, "cannot get property " + property);
  answer = defaultValue;
  Tracer.trace("getProperty", "answer = " + answer);
}
return answer;
} // end getProperty()

// flags for getValue()
static final int NO_FLAG = 0;
static final int REMOVE_BLANKS = 1;
static final int QUOTED_VALUE = 2;
static final int UNQUOTED_VALUE = 3;
/***********************************************************************
**
** getValue(target)
**
***********************************************************************/
String getValue(Object target, int flag)
{
  String valstr = getvalue(target);
  switch (flag)
  {
    case QUOTED_VALUE:
    return "\"" + valstr + "\"";

case REMOVE_BLANKS:
      return valstr.replace(' ', '_');

case UNQUOTED_VALUE:
    return valstr;

default:
    try
    {
      new Float(valstr);
    }
    catch (NumberFormatException nfe) // not the number!
    {
      return "\"" + valstr + "\"";
```

```
    }
    return valstr;
  }
} // end getValue()

/************************************************************************
**
** getvalue(target)
**
************************************************************************/
String getvalue(Object target)
{
  if (target instanceof Button)
  {
    String label = ((Button)target).getLabel();
    if (label == null || label.length() == 0)
    return "NIL";
    else
    return label;
  }
  else if (target instanceof Checkbox)
  {
    boolean state = ((Checkbox)target).getState();
    return YesOrNo(state);
  }
  else if (target instanceof CheckboxGroup)
  {
    Checkbox checkbox = ((CheckboxGroup)target).getCurrent();
    if (checkbox != null)
    return checkbox.getLabel();
    else return "NIL";
  }
  else if (target instanceof CheckboxMenuItem)
  {
    boolean state = ((CheckboxMenuItem)target).getState();
    return YesOrNo(state);
  }
  else if (target instanceof Choice)
  {
    String item = ((Choice)target).getSelectedItem();
    if (item == null || item.length() == 0)
    return "NIL";
    else
    return item;
  }
  else if (target instanceof Label)
  {
    String item = ((Label)target).getText();
    if (item == null || item.length() == 0)
    return "NIL";
    else
    return item;
  }
  else if (target instanceof List)
```

```
  {
    if (((List)target).allowsMultipleSelections())
    {
      String[] items = ((List)target).getSelectedItems();
      if (items.length == 0)
        return "NIL";
      String value = "";
      for (int i = 0; i < items.length; i++)
        value += "\n" + items[i];
      return value;
    }
    else
    {
      String item = ((List)target).getSelectedItem();
      if (item == null || item.length() == 0)
        return "NIL";
      else
        return item;
    }
  }
  else if (target instanceof Scrollbar)
  {
    int value = ((Scrollbar)target).getValue();
    return Integer.toString(value);
  }
  else if (target instanceof String)
    return (String)target;
  else if (target instanceof TextComponent)
  {
    String text = ((TextComponent)target).getText().trim();
    if (text == null || text.length() == 0)
      return "NIL";
    else
    try
    {
      int value = Integer.parseInt(text);
      return text;
    }
    catch (NumberFormatException nfe)
    {
      return text;
    }
  }
  return "NIL";
} // end getvalue()

/**********************************************************************
**
** CollectData()
**
** example of input format of sep: ((region <regionid>) ... )
**              (<keyname1> <jesslabel1>)
**              (<keyname2> <jesslabel2>)
**                  (quoteMe <keyname3> <jesslabel3>)
```

```
**                (dontQuoteMe <keyname4> <jesslabel4>)
**                (removeBlanks <keyname5> <jesslabel5>) ... )
**
** example of output format: (region <regionid>) ...
**                (<jesslabel1> -123)
**                (<jesslabel2> "hello world")
**                (<jesslabel3> "-123")
**                (<jesslabel4> hello world)
**                (<jesslabel5> hello_world) ...
**
*********************************************************************/
String CollectData(S_Expr sep)
{
  Tracer.trace("CollectData", "message:\n[" + sep.toString(1024) + "]");

String value;
  Object object;
  String report = JessTFax.startMessage(sep.getNext());
  int valueflag;

// (region <regionid>) ...
  S_Expr hardslots = new S_Expr(this, sep.getFirst());
  while (!hardslots.isEmpty())
  {
    String hardslot = hardslots.getFirst();
    report += hardslot;
  }

// (<keyname> <jesslabel>) ...
  while (!sep.isEmpty())
  {
    valueflag = NO_FLAG;
    S_Expr slot = new S_Expr(this, sep.getFirst());
    String key = slot.getFirst();
    if (key.equals("removeBlanks"))
    {
    valueflag = REMOVE_BLANKS;
    key = slot.getNext();
    }
    else if (key.equals("quoteMe"))
    {
    valueflag = QUOTED_VALUE;
    key = slot.getNext();
    }
    else if (key.equals("dontQuoteMe"))
    {
    valueflag = UNQUOTED_VALUE;
    key = slot.getNext();
    } object = idea.Lookup(key);
    if (!Assert.check(errorTextArea, object != null,
                key + " is not present in the idea"))
      return null;
```

```
      value = getValue(object, valueflag);
      String label = slot.getNext();
      Tracer.trace("CollectData", "(" + label + " " + value + ")");
      report = JessTFax.addSlot(report, label, value);
    }
    Tracer.trace("CollectData", "report: [" + report + "]");
    return report;
  } // end CollectData()

/***********************************************************************
  **
  ** ProcessMsg(button, command, msg)
  **
  ***********************************************************************/
  boolean ProcessMsg(Button button, int command, S_Expr msg)
  {
    Tracer.trace("ProcessMsg", Guiscript.getCmdStr(command) + " " +
msg.toString(1024));
    if (command == Guiscript.SET_TEXT)
      button.setLabel(msg.concatArgs());
    else
      return ProcessMsg((Component)button, command, msg);
    return true;
  } // end ProcessMsg()

/***********************************************************************
  **
  ** ProcessMsg(checkbox, command, args)
  **
  ***********************************************************************/
  boolean ProcessMsg(Checkbox checkbox, int command, S_Expr msg)
  {
    Tracer.trace("ProcessMsg", Guiscript.getCmdStr(command) + " " +
msg.toString(1024));
    switch (command)
    {
      case Guiscript.SET_VALUE:
      String state = msg.getFirst();
      checkbox.setState(state.equals("true"));
      break;

case Guiscript.SET_TEXT:
      checkbox.setLabel(msg.concatArgs());
      break;

default:
      return ProcessMsg((Component)checkbox, command, msg);
    }
    return true;
  } // end ProcessMsg()

/***********************************************************************
```

```
**
** ProcessMsg(parent, checkboxgroup, command, msg)
**
*****************************************************************/
boolean ProcessMsg(CheckboxGroup checkboxgroup, int command, S_Expr msg)
{
  String keyname;
  Checkbox checkbox;

Tracer.trace("ProcessMsg", Guiscript.getCmdStr(command) + " " +
msg.toString(1024));
  switch (command)
  {
    case Guiscript.ADD_CHECKBOX:
    Container parent;
    keyname = idea.getKey(checkboxgroup);
    int lastseppos = keyname.lastIndexOf(Guiscript.KEY_SEPARATOR);
    if (lastseppos > 0)
    {
      String parentkeyname = keyname.substring(0, lastseppos);
      parent = (Container)idea.Lookup(parentkeyname);
    }
    else
      parent = null;
    checkbox = addCheckbox(parent, checkboxgroup, msg);
    checkbox.setCheckboxGroup(checkboxgroup);
    break;

case Guiscript.SET_VALUE:
    keyname = msg.getFirst();
    checkbox = (Checkbox)idea.Lookup(keyname);
    if (checkbox != null)
      checkboxgroup.setCurrent(checkbox);
    break;

default:
    Assert.check(errorTextArea, false, "invalid command " +
                 Guiscript.getCmdStr(command) + " for a CheckboxGroup");
    return false;
  }
  return true;
} // end ProcessMsg()

/*****************************************************************
**
** ProcessMsg(choice, command, msg)
**
*****************************************************************/
boolean ProcessMsg(Choice choice, int command, S_Expr msg)
{
  Tracer.trace2("ProcessMsg", Guiscript.getCmdStr(command) + " " +
msg.toString(1024));
  switch (command)
  {
```

```
      case Guiscript.SET_VALUE:
      choice.select(msg.getFirst());
      break;

default:
      return ProcessMsg((Component)choice, command, msg);
    }
    return true;
} // end ProcessMsg()

static GridBagConstraints gbc; // used for GridBagLayout and XYLayout only

/**********************************************************************
**
** resetConstraints()
**
**********************************************************************/
static void resetConstraints()
{
  gbc.gridx = GridBagConstraints.RELATIVE;
  gbc.gridy = GridBagConstraints.RELATIVE;
  gbc.gridwidth = 1;
  gbc.gridheight = 1;
  gbc.weightx = 1.0;
  gbc.weighty = 1.0;
  gbc.anchor = GridBagConstraints.WEST;
  gbc.fill = GridBagConstraints.BOTH;
  gbc.insets = new Insets(0, 0, 0, 0);
  gbc.ipadx = 0;
  gbc.ipady = 0;
} // end resetConstraints()

static
{
  gbc = new GridBagConstraints();
  resetConstraints();
}

/**********************************************************************
**
** ProcessMsg(menucomponent, command, msg)
**
**********************************************************************/
boolean ProcessMsg(MenuComponent menucomponent, int command, S_Expr msg)
{
   Tracer.trace("ProcessMsg", Guiscript.getCmdStr(command) + " " +
msg.toString(1024));
   Dimension screen = new Dimension(Toolkit.getDefaultToolkit().getScreenSize());
   switch (command)
   {
     case Guiscript.SET_FONT:
     case Guiscript.SET_FONT_PERCENT:
```

```
      String name = msg.getFirst();
      String stylestr = msg.getNext();
      int style;
      if (stylestr.equals("BOLD"))
        style = Font.BOLD;
      else if (stylestr.equals("ITALIC"))
        style = Font.ITALIC;
      else if (stylestr.equals("PLAIN"))
        style = Font.PLAIN;
      else
      {
        Assert.prompt(errorTextArea, false, "Font style " + stylestr + " is
invalid");
        break;
      }
      int size = Integer.parseInt(msg.getNext());
      if (command == Guiscript.SET_FONT_PERCENT)
        size *= screen.height / 480;
      menucomponent.setFont(new Font(name, style, size));
      break;

default:
      Assert.prompt(errorTextArea, false, "unrecognized command " +
                    Guiscript.getCmdStr(command) + " [" + msg + "]");
      return false;
    }
    return true; // processed this msg
  } // end ProcessMsg()

/************************************************************************
  **
  ** ProcessMsg(menuitem, command, msg)
  **
  ************************************************************************/
  boolean ProcessMsg(MenuItem menuitem, int command, S_Expr msg)
  {
    Tracer.trace("ProcessMsg", Guiscript.getCmdStr(command) + " " +
msg.toString(1024));
    String parentstr;
    StringTokenizer st;
    Frame parent;
    Dimension d;
    switch (command)
    {
      case Guiscript.ENABLE:
      menuitem.enable();
      parentstr = idea.getKey(menuitem);
      st = new StringTokenizer(parentstr, ">");
      parent = (Frame)idea.Lookup(st.nextToken());
      d = parent.size();
      parent.resize(d.width-1, d.height-1);
      parent.resize(d.width, d.height);
      break;
```

```
      case Guiscript.DISABLE:
      menuitem.disable();
      parentstr = idea.getKey(menuitem);
      st = new StringTokenizer(parentstr, ">");
      parent = (Frame)idea.Lookup(st.nextToken());
      d = parent.size();
      parent.resize(d.width-1, d.height-1);
      parent.resize(d.width, d.height);
      break;

case Guiscript.SET_TEXT:
      String label = msg.getFirst();
      menuitem.setLabel(label);
      break;

default:
      return ProcessMsg((MenuComponent)menuitem, command, msg);
   }
   return true; // processed this msg
} // end ProcessMsg()

/************************************************************************
**
** ProcessMsg(menu, command, msg)
**
*************************************************************************/
boolean ProcessMsg(Menu menu, int command, S_Expr msg)
{
   Tracer.trace("ProcessMsg", Guiscript.getCmdStr(command) + " " +
msg.toString(1024));
   return ProcessMsg((MenuItem)menu, command, msg);
} // end ProcessMsg()

/************************************************************************
**
** ProcessMsg(checkboxmenuitem, command, msg)
**
*************************************************************************/
boolean ProcessMsg(CheckboxMenuItem cbmi, int command, S_Expr msg)
{
   Tracer.trace("ProcessMsg", Guiscript.getCmdStr(command) + " " +
msg.toString(1024));
   switch (command)
   {
      case Guiscript.SET_VALUE:
      String state = msg.getFirst();
      cbmi.setState(state.equals("true"));
      break;

default:
      return ProcessMsg((MenuItem)cbmi, command, msg);
   }
   return true;
```

```
} // end ProcessMsg()

/************************************************************************
**
** playMovieScript(scriptName)
**
** runs a "movie" script
**
*************************************************************************/
MoviePlayer playMovieScript(String scriptName)
{
  String script = (String)idea.Lookup(scriptName);
  S_Expr sep = new S_Expr(this, "(" + script);
  MoviePlayer movieplayer = new MoviePlayer(this, sep);
  Assert.prompt(errorTextArea, movieplayer != null, "movie script " + scriptName +
                                " not found");
  movieplayer.start();
  return movieplayer;
}

/************************************************************************
**
** GetFile(args)
**
*************************************************************************/
void GetFile(S_Expr args)
{
  DataInputStream dis;
  int filesize;
  byte[] buf;
  while (!args.isEmpty())
  {
    String file = args.getNext();
    dis = null;
    filesize = 0;
    buf = null;
    try
    {
    URL url = new URL(idea.getCodeBase(), file);
    dis = (DataInputStream) url.openStream();
    filesize = dis.available();
    Tracer.trace("GetFile", "File Size:  " + filesize);
    buf = new byte[filesize];
    dis.readFully(buf);
    dis.close();
    }
    catch (Exception e)
    {
    Tracer.trace("GetFile", "couldn't find URL for file "
             + file + "; trying to open " + file + " locally...");
    try
    {
      dis = new DataInputStream(new FileInputStream(file));
```

```
      filesize = dis.available();
      buf = new byte[filesize];
      dis.readFully(buf);
      dis.close();
    }
    catch (FileNotFoundException fnfe)
    {
      Assert.prompt(errorTextArea, fnfe, file + " does not exist");
      continue;
    }
    catch (IOException ioe)
    {
      Assert.prompt(errorTextArea, ioe, file + " can't be opened");
      continue;
    }
    catch (SecurityException se)
    {
      Assert.prompt(errorTextArea, se,
             file + " can't be opened due to security restrictions.");
      continue;
    }
    }
    Tracer.trace("GetFile", "Read guiscript from " + file);
    ProcessMsg(buf, 0);
  }
} // end GetFile()

/************************************************************************
**
** PlayScript(args)
**
*************************************************************************/
void PlayScript(S_Expr args)
{
  while (!args.isEmpty())
  {
    String key = args.getNext();
    Object object = idea.Lookup(key);
    if (!Assert.check(errorTextArea, object != null, key + " is not present in the
idea"))
      continue;
    String value = getValue(object, NO_FLAG); // BTM - no surrounding quotes?
    StringBufferInputStream sbis =
      new StringBufferInputStream(value.substring(1, value.length()-1));
    byte[] buf = new byte[value.length()];
    Tracer.trace("PlayScript", "Read guiscript [" +
                   value.substring(1, value.length()-1) +
                   "] from " + key);
    sbis.read(buf, 0, value.length()-2);
    ProcessMsg(buf, 0);
  }
} // end PlayScript()
```

```
/************************************************************************
**
** GetAudioClip(args)
**
************************************************************************/
void GetAudioClip(S_Expr args)
{
  String keyName = args.getFirst();
  String fileName = args.getNext();
  try
  {
    URL url = new URL(idea.getCodeBase(), fileName);
    AudioClip ac = idea.getAudioClip(url);
    if (ac != null)
    idea.Register(ac, keyName);
  }
  catch (MalformedURLException mue) {
    Assert.check(errorTextArea, mue, "bad URL " + fileName);
  }
} // end GetAudioClip()

/************************************************************************
**
** PlayAudioClip(args)
**
************************************************************************/
void PlayAudioClip(S_Expr args)
{
  String keyName = args.getFirst();
  AudioClip ac = (AudioClip)idea.Lookup(keyName);
  if (ac != null)
    ac.play();
} // end PlayAudioClip()

/************************************************************************
**
** LoopAudioClip(args)
**
************************************************************************/
void LoopAudioClip(S_Expr args)
{
  String keyName = args.getFirst();
  AudioClip ac = (AudioClip)idea.Lookup(keyName);
  if (ac != null)
    ac.loop();
} // end LoopAudioClip()

/************************************************************************
**
** StopAudioClip(args)
**
************************************************************************/
```

```
void StopAudioClip(S_Expr args)
{
  String keyName = args.getFirst();
  AudioClip ac = (AudioClip)idea.Lookup(keyName);
  if (ac != null)
     ac.stop();
} // end StopAudioClip()

/**********************************************************************
**
** makeColor(args)
**
**********************************************************************/
Color makeColor(S_Expr sep)
{
  Tracer.trace("ClientInterpreter.makeColor", "sep = " + sep);
  Color color = Color.black;
  int red, green, blue;
  boolean colorIsString = true;
  String colorstr = sep.getFirst();
  Tracer.trace("ClientInterpreter.makeColor", "colorstr = " + colorstr);
  try
  {
    red = Integer.parseInt(colorstr); // fails if color is a color name
    green = sep.getint();
    blue = sep.getint();
    color = new Color(red, green, blue);
    colorIsString = false;
  }
  catch (NumberFormatException nfe) {}
  if (colorIsString)
     color = Guiscript.getColor(colorstr);
  return color;
} // end makeColor()

/**********************************************************************
**
** ProcessMsg(component, command, args)
**
**********************************************************************/
boolean ProcessMsg(Component component, int command, S_Expr msg)
{
   Tracer.trace("ProcessMsg", component + ": " + Guiscript.getCmdStr(command) + " "
+ msg.toString(1024));
    int r, g, b, x, y, width, height;
    Dimension screen = new Dimension(Toolkit.getDefaultToolkit().getScreenSize());
    Color color;

switch (command)
    {
      case Guiscript.DISABLE:
      component.disable();
      component.repaint();
```

```
break;

case Guiscript.ENABLE:
String arg = msg.getFirst();
boolean flag = ((arg != null && arg.equals("true")) ? true : false);
component.enable(flag);
component.repaint();
break;

case Guiscript.HIDE:
component.hide();
break;

case Guiscript.MOVE:
x = Integer.parseInt(msg.getFirst());
y = Integer.parseInt(msg.getNext());
component.move(x, y);
break;

case Guiscript.MOVE_PERCENT:
x = Integer.parseInt(msg.getFirst());
y = Integer.parseInt(msg.getNext());
component.move((screen.width * x)/100, (screen.height * y)/100);
break;

case Guiscript.ON_EVENT:
String eventId = msg.getFirst();
idea.StoreEventActions(component, Guiscript.eventID(eventId), msg);
break;

case Guiscript.RESIZE:
width = Integer.parseInt(msg.getFirst());
Tracer.trace("ProcessMsg", "width: " + width);
height = Integer.parseInt(msg.getFirst());
Tracer.trace("ProcessMsg", "height: " + height);
component.resize(width, height);
break;

case Guiscript.RESIZE_PERCENT:
width = Integer.parseInt(msg.getFirst());
Tracer.trace("ProcessMsg", "width: " + width);
height = Integer.parseInt(msg.getFirst());
Tracer.trace("ProcessMsg", "height: " + height);
Assert.check(errorTextArea, width <= 100 && height <= 100,
        "One or both Resizing values (" + width + ", " + height +
        ") are larger than 100.\nThis may not do what you want.");
component.resize((screen.width * width)/100, (screen.height * height)/100);
break;

case Guiscript.SET_BACKGROUND:
color = makeColor(msg);
Tracer.trace("ProcessMsg", "Background color = " + color);
component.setBackground(color);
break;
```

```
    case Guiscript.SET_CONSTRAINTS:
    ProcessConstraintsMsg(component, msg);
    break;

case Guiscript.SET_FONT:
    case Guiscript.SET_FONT_PERCENT:
    String name = msg.getFirst();
    String stylestr = msg.getNext();
    int style;
    if (stylestr.equals("BOLD"))
      style = Font.BOLD;
    else if (stylestr.equals("ITALIC"))
      style = Font.ITALIC;
    else if (stylestr.equals("PLAIN"))
      style = Font.PLAIN;
    else
    {
      Assert.prompt(errorTextArea, false, "Font style " + stylestr + " is
invalid");
      break;
    }
    int size = Integer.parseInt(msg.getNext());
    if (command == Guiscript.SET_FONT_PERCENT)
    {
      size *= screen.height / 4800;
    }
    component.setFont(new Font(name, style, size));
    break;

case Guiscript.SET_FOREGROUND:
    color = makeColor(msg);
    Tracer.trace("ProcessMsg", "Foreground color = " + color);
    component.setForeground(color);
    break;

case Guiscript.SHOW:
    component.show();
    break;

case Guiscript.SHOW_AT:
    x = msg.getint();
    y = msg.getint();
    component.move(x, y);
    component.show();
    break;

case Guiscript.VALIDATE:
    component.validate();
    break;

default:
    ProcessMsg(command, msg);
  }
  return true; // processed this msg
} // end ProcessMsg()
```

```
/************************************************************************
**
** ProcessConstraintsMsg(parent, component, msg)
**
*************************************************************************/
boolean ProcessConstraintsMsg(Component component, S_Expr msg)
{
   Tracer.trace("ProcMsg.ProcessConstraintsMsg", component + " [" +
msg.toString(1024) + "]");
   int BOGUS = -9999;
   String msgstr;
   int intval;

resetConstraints();

while (!msg.isEmpty())
   {
     S_Expr slot = new S_Expr(this, msg.getNext());
     String constraint = slot.getFirst();
     msgstr = slot.getNext();

intval = BOGUS;
     if (msgstr.equals("REMAINDER"))
        intval = GridBagConstraints.REMAINDER;
     else if (msgstr.equals("RELATIVE"))
        intval = GridBagConstraints.RELATIVE;

Tracer.trace("ProcMsg.ProcessConstraintsMsg",
              "constraint slot: " + " [" + constraint + "," + msgstr + "]");

switch (Guiscript.getGbcID(constraint))
     {
     case Guiscript.ANCHOR:
       gbc.anchor = Guiscript.getGbcID(msgstr);
       break;

case Guiscript.FILL:
       gbc.fill = Guiscript.getGbcID(msgstr);
       break;

case Guiscript.GRIDHEIGHT:
       if (intval > BOGUS)
         gbc.gridheight = intval;
       else
         gbc.gridheight = Integer.parseInt(msgstr);
       break;

case Guiscript.GRIDWIDTH:
       if (intval > BOGUS)
         gbc.gridwidth = intval;
       else
         gbc.gridwidth = Integer.parseInt(msgstr);
       break;
```

```
        case Guiscript.GRIDX:
          if (intval > BOGUS)
            gbc.gridx = intval;
          else
            gbc.gridx = Integer.parseInt(msgstr);
          break;

case Guiscript.GRIDY:
          if (intval > BOGUS)
            gbc.gridy = intval;
          else
            gbc.gridy = Integer.parseInt(msgstr);
          break;

case Guiscript.INSETS:
          int a = Integer.parseInt(msgstr);
          int b = Integer.parseInt(slot.getNext());
          int c = Integer.parseInt(slot.getNext());
          int d = Integer.parseInt(slot.getNext());
          gbc.insets = new Insets(a, b, c, d);
          break;

case Guiscript.IPADX:
          gbc.ipadx = Integer.parseInt(msgstr);
          break;

case Guiscript.IPADY:
          gbc.ipady = Integer.parseInt(msgstr);
          break;

case Guiscript.WEIGHTX:
          double weightx = Double.valueOf(msgstr).doubleValue();
          gbc.weightx = weightx;
          break;

case Guiscript.WEIGHTY:
          double weighty = Double.valueOf(msgstr).doubleValue();
          gbc.weighty = weighty;
          break;

default:
          Assert.prompt(errorTextArea, false, "unrecognized Constraint " +
constraint);
        } // end switch
      } // end while //
      // try to install Constraints
      //
      Tracer.trace2("ProcMsg.ProcessConstraintsMsg",
              "setting constraint for " + component);
//    if (!(component instanceof Window_Reportable))
//       return false;
//    Container parent = getParent((Window_Reportable)component);
//    if (parent == null)
```

```
//     return false;
   LayoutManager lm = component.getParent().getLayout();
   if (lm instanceof GridBagLayout)
   {
     Tracer.trace("ProcMsg.ProcessConstraintsMsg", "LayoutManager:   " +
             lm + ",  Component:   " + component);
     ((GridBagLayout)lm).setConstraints(component, gbc);
     return true; // processed this msg
   }
   return false;
} // end ProcessConstraintsMsg()

static GridBagLayout gbl;
static XYLayout xyl;

static
{
  gbl = new GridBagLayout();
  xyl = new XYLayout();
}

/************************************************************************
**
** ProcessMsg(container, command, msg)
**
************************************************************************/
boolean ProcessMsg(Container container, int command, S_Expr msg)
{
   Tracer.trace("ProcessMsg", Guiscript.getCmdStr(command) + " " +
msg.toString(1024));
   switch (command)
   {
     case Guiscript.SET_LAYOUT:
       String layout = msg.getFirst();
       if (layout.equals("GridBagLayout"))
         container.setLayout(gbl);
       else if (layout.equals("GridLayout"))
       {
         int rows = msg.getint();
         int cols = msg.getint();
         if (!msg.isEmpty())
         {
           int hgap = msg.getint();
           int vgap = msg.getint();
           container.setLayout(new GridLayout(rows, cols, hgap, vgap));
         }
         else
           container.setLayout(new GridLayout(rows, cols));
       }
       else if (layout.equals("FallLayout"))
       {
         if (!msg.isEmpty()) // alignment
         {
           String alignstr = msg.getFirst();
```

```
          int align;
          if (alignstr.equals("TOP"))
            align = FallLayout.TOP;
          else if (alignstr.equals("BOTTOM"))
            align = FallLayout.BOTTOM;
          else // the default
            align = FallLayout.CENTER;
          if (!msg.isEmpty()) // gaps
          {
            int hgap = msg.getint();
            int vgap = msg.getint();
            container.setLayout(new FallLayout(align, hgap, vgap));
          }
          else
            container.setLayout(new FallLayout(align));
        }
        else
          container.setLayout(new FallLayout());
      }
      else if (layout.equals("FlowLayout"))
      {
        if (!msg.isEmpty()) // alignment
        {
          String alignstr = msg.getFirst();
          int align;
          if (alignstr.equals("LEFT"))
            align = FlowLayout.LEFT;
          else if (alignstr.equals("RIGHT"))
            align = FlowLayout.RIGHT;
          else // the default
            align = FlowLayout.CENTER;
          if (!msg.isEmpty()) // gaps
          {
            int hgap = msg.getint();
            int vgap = msg.getint();
            container.setLayout(new FlowLayout(align, hgap, vgap));
          }
          else
            container.setLayout(new FlowLayout(align));
        }
        else
          container.setLayout(new FlowLayout());
      }
      else if (layout.equals("BorderLayout"))
        container.setLayout(new BorderLayout());
      else if (layout.equals("XYLayout"))
        container.setLayout(xyl);
      Tracer.trace("ProcessMsg", Guiscript.getCmdStr(command) + " " + layout);
      break;

//    case Guiscript.NEW:
//      return ProcessNEW(container, msg) != null;

case Guiscript.ADD_BUTTON:
        addButton(container, msg);
```

```
break;

case Guiscript.ADD_CANVAS:
addCanvas(container, msg);
break;

case Guiscript.ADD_CHECKBOX:
addCheckbox(container, msg);
break;

case Guiscript.ADD_CHECKBOX_GROUP:
addCheckboxGroup(container, msg);
break;

case Guiscript.ADD_CHOICE:
addChoice(container, msg);
break;

case Guiscript.ADD_ERROR_DISPLAY:
addErrorDisplay(container, msg);
break;

case Guiscript.ADD_FRAME:
addFrame(container, msg);
break;

case Guiscript.ADD_IMAGE:
addImage(container, msg);
break;

case Guiscript.ADD_LABEL:
addLabel(container, msg);
break;

case Guiscript.ADD_LIST:
addList(container, msg);
break;

case Guiscript.ADD_MULTISTATE_BUTTON:
addMultiState_Button(container, msg);
break;

case Guiscript.ADD_PANEL:
addPanel(container, msg);
break;

case Guiscript.ADD_SCROLLBAR:
addScrollbar(container, msg);
break;

case Guiscript.ADD_SCROLLER_PANEL:
addScrollerPanel(container, msg);
break;

case Guiscript.ADD_SEPARATOR:
```

```
      addSeparator(container, msg);
      break;

case Guiscript.ADD_TEXT_AREA:
      addTextArea(container, msg);
      break;

case Guiscript.ADD_TEXT_FIELD:
      addTextField(container, msg);
      break;

case Guiscript.ADD_VIEW_3D:
      addView3D(container, msg);
      break;

default:
      Tracer.trace("ProcessMsg", msg.getPrevCommand());
      return ProcessMsg((Component)container, command, msg);
    }
    return true;
} // end ProcessMsg()

/************************************************************************
**
** ProcessMsg(dialog, command, msg)
**
************************************************************************/
boolean ProcessMsg(Frame parent, Dialog dialog, int command,
                   S_Expr msg)
{
    Tracer.trace("ProcessMsg", Guiscript.getCmdStr(command) + " " +
msg.toString(1024));
    switch (command)
    {
      case Guiscript.SET_RESIZABLE:
        String arg = msg.getFirst();
        boolean flag = ((arg != null && arg.equals("true")) ? true : false);
        dialog.setResizable(flag);
        break;

default:
        return ProcessMsg((Window)dialog, command, msg);
    }
    return true;
} // end ProcessMsg()

/************************************************************************
**
** ProcessMsg(frame, command, msg)
**
************************************************************************/
boolean ProcessMsg(Frame frame, int command, S_Expr msg)
{
```

```
//    MenuBar menubar = null;
//    Menu menu = null;
      Tracer.trace("ProcessMsg", Guiscript.getCmdStr(command) + " " +
msg.toString(1024));
//    String menukey;

switch (command)
      {
        case Guiscript.ADD_DIALOG:
        addDialog(frame, msg);
        break;

case Guiscript.ADD_WINDOW:
        addWindow(frame, msg);
        break;

case Guiscript.ADD_MENU:
        MenuBar menubar = frame.getMenuBar();
        if (menubar == null)
        {
          menubar = new MenuBar();
          frame.setMenuBar(menubar);
        }
//      Tracer.trace("ProcessMsg", menubar + " " + menu);
        addMenu(frame, menubar, msg);
//      String framekey = idea.getKey(frame);
//      if (framekey.length() == 0)
//        menukey = msg.getFirst();
//      else
//        menukey = framekey + KEY_SEPARATOR + msg.getFirst();
//
//      String menuName = msg.getNext();
//      menu = new Menu(menuName);
////     idea.addObject(menukey, menu);
//      if (frame instanceof Frame)
//        ((Frame)frame).ProcessCreateMenuMsg(menu, msg);
//      Tracer.trace("ProcessMsg", menubar + " " + menu);
//      menubar.add(menu);
        break;

case Guiscript.SET_CURSOR:
        frame.setCursor(Guiscript.getCursorID(msg.getFirst()));
        break;

case Guiscript.SET_RESIZABLE:
        String arg = msg.getFirst();
        boolean flag = ((arg != null && arg.equals("true")) ? true : false);
        frame.setResizable(flag);
        break;

case Guiscript.SET_TEXT:
        frame.setTitle(msg.concatArgs());
        break;
```

```
      default:
      return ProcessMsg((Window)frame, command, msg);
   }
   return true;
} // end ProcessMsg()

/*************************************************************************
**
** ProcessMsg(label, command, msg)
**
*************************************************************************/
boolean ProcessMsg(Label label, int command, S_Expr msg)
{
   Tracer.trace("ProcessMsg", Guiscript.getCmdStr(command) + " " +
msg.toString(1024));
   switch (command)
   {
      case Guiscript.SET_ALIGNMENT:
      String alignment = msg.getFirst();
      if (alignment.equals("CENTER"))
         label.setAlignment(Label.CENTER);
      else if (alignment.equals("RIGHT"))
         label.setAlignment(Label.RIGHT);
      else
         label.setAlignment(Label.LEFT);
      break;

case Guiscript.SET_TEXT:
      label.setText(msg.concatArgs());
      break;

default:
      return ProcessMsg((Component)label, command, msg);
   }
   return true;
} // end ProcessMsg()

/*************************************************************************
**
** ProcessMsg(list, command, args)
**
*************************************************************************/
boolean ProcessMsg(List list, int command, S_Expr msg)
{
   Tracer.trace("ProcessMsg", Guiscript.getCmdStr(command) + " " +
msg.toString(1024));
   String text;
   int index;
   switch (command)
   {
      case Guiscript.ADD_ITEM:
      text = msg.getNext();
      int listSize = list.countItems();
```

```
boolean exists = false;
for (int i = 0; i < listSize; i++) {
  if (text.equals(list.getItem(i))) {
    exists = true;
  }
}
if (exists == false) {
  list.addItem(text);
}
break;

case Guiscript.ADD_ITEM_ALWAYS:
text = msg.getNext();
list.addItem(text);
break;

case Guiscript.ADD_ITEMS:
while (!msg.isEmpty())
{
  text = msg.getQuotedString();
  if (text.indexOf('\n') >= 0 ||
      text.indexOf('\r') >= 0) // treat this as a "list" of items
  {
    StringTokenizer st = new StringTokenizer(text, "\n\r");
    while(st.hasMoreTokens())
      list.addItem(st.nextToken());
  }
  else
    list.addItem(text);
}
break;

case Guiscript.DEL_ITEM:
index = msg.getint();
if (index < list.countItems())
  list.delItem(index);
break;

case Guiscript.DEL_STRING:
text = msg.getQuotedString();
int size = list.countItems();
for (int i = 0; i < size; i++) {
  if (text.equals(list.getItem(i)))
  {
    list.delItem(i);
    break;
  }
}
break;

case Guiscript.DESELECT:
index = Integer.parseInt(msg.getNext());
list.deselect(index);
break;
```

```
//      case Guiscript.FIND_ITEM:
//    text = msg.getNext();
//    int size = list.countItems();
//    for (int i = 0; i < size; i++)
//      if (text.equals(list.getItem(i))
//BTM - continue here
//    break;

case Guiscript.INSERT_ITEM:
      index = Integer.parseInt(msg.getNext());
      text = msg.getNext();
      list.addItem(text, index);
      break;

case Guiscript.INSERT_ITEMS:
      index = Integer.parseInt(msg.getNext());
      while (!msg.isEmpty())
      {
        text = msg.getQuotedString();
        list.addItem(text, index++);
      }
      break;

case Guiscript.CLEAR:
      list.clear();
      break;

case Guiscript.MAKE_VISIBLE:
      index = Integer.parseInt(msg.getNext());
      list.makeVisible(index);
      break;

case Guiscript.SELECT:
      index = Integer.parseInt(msg.getNext());
      list.select(index);
      break;

case Guiscript.SET_MULTIPLE_SELECTIONS:
      boolean flag = Boolean.getBoolean(msg.getNext());
      list.setMultipleSelections(flag);
      break;

default:
      return ProcessMsg((Component)list, command, msg);
    }
    return true;
} // end ProcessMsg()

/**********************************************************************
**
** ProcessMsg(ms_button, command, msg)
**
**********************************************************************/
boolean ProcessMsg(MultiState_Button ms_button, int command, S_Expr msg)
```

```
   {
      Tracer.trace2("ProcessMsg", Guiscript.getCmdStr(command) + " " +
   msg.toString(1024));
      switch (command)
      {
         case Guiscript.SET_VALUE:
         ms_button.select(msg.getFirst());
         break;

default:
         return ProcessMsg((Component)ms_button, command, msg);
      }
      return true;
   } // end ProcessMsg()

/*****************************************************************
   **
   ** ProcessMsg(panel, command, msg)
   **
   *****************************************************************/
   boolean ProcessMsg(Panel panel, int command, S_Expr msg)
   {
      Tracer.trace("ProcessMsg.Panel", Guiscript.getCmdStr(command) + " " +
   msg.toString(1024));
      if (panel instanceof Window_CanvasPanel)
      {
         Window_CanvasPanel wcp = (Window_CanvasPanel)panel;
         return ProcessGraphicsMsg(wcp, command, msg) ||
            ProcessMsg((Container)wcp, command, msg);
      } // end if (panel instanceof Window_CanvasPanel)
      else if (panel instanceof View3D)
      {
         View3D view3d = (View3D)panel;
         return ProcessGraphicsMsg(view3d, command, msg) ||
            ProcessMsg((Container)view3d, command, msg);
      } // end if (panel instanceof View3D)
      else
         return ProcessMsg((Container)panel, command, msg);
   } // end ProcessMsg()

/*****************************************************************
   **
   ** ProcessMsg(scrollbar, command, msg)
   **
   *****************************************************************/
   boolean ProcessMsg(Scrollbar scrollbar, int command, S_Expr msg)
   {
      Tracer.trace("ProcessMsg", Guiscript.getCmdStr(command) + " " +
   msg.toString(1024));
      switch (command)
      {
         case Guiscript.SET_LINE_INCREMENT:
         scrollbar.setLineIncrement(Integer.parseInt(msg.getFirst()));
```

```
      break;

case Guiscript.SET_PAGE_INCREMENT:
      scrollbar.setPageIncrement(Integer.parseInt(msg.getFirst()));
      break;

case Guiscript.SET_VALUE:
      scrollbar.setValue(Integer.parseInt(msg.getFirst()));
      break;

case Guiscript.SET_VALUES:
      int val = Integer.parseInt(msg.getFirst());
      int vis = Integer.parseInt(msg.getNext());
      int min = Integer.parseInt(msg.getNext());
      int max = Integer.parseInt(msg.getNext());
      scrollbar.setValues(val, vis, min, max);
      break;

default:
      return ProcessMsg((Component)scrollbar, command, msg);
   }
   return true;
} // end ProcessMsg()

/*************************************************************************
**
** ProcessMsg(separator, command, msg)
**
*************************************************************************/
boolean ProcessMsg(Separator separator, int command, S_Expr msg)
{
   Tracer.trace("ProcessMsg", Guiscript.getCmdStr(command) + " " +
msg.toString(1024));
   switch (command)
   {
      case Guiscript.SET_ETCHING:
      String etching = msg.getFirst();
      if (etching.equals("OUT"))
         separator.setEtching(Separator.OUT);
      else
         separator.setEtching(Separator.IN);
      break;

case Guiscript.SET_CONSTRAINTS:
      return ProcessMsg((Component)separator, command, msg);

default:
      Assert.check(errorTextArea, false, "invalid command " +
Guiscript.getCmdStr(command));
      return false;
   }
   return true;
} // end ProcessMsg()
```

```
/*************************************************************
**
** ProcessMsg(textarea, command, msg)
**
*************************************************************/
boolean ProcessMsg(TextArea textarea, int command, S_Expr msg)
{
   Tracer.trace("ProcessMsg", Guiscript.getCmdStr(command) + " " +
msg.toString(1024));
   switch (command)
   {
     case Guiscript.APPEND_TEXT:
     textarea.appendText(msg.concatArgs());
     break;

case Guiscript.INSERT_TEXT:
     int pos = msg.getint();
     textarea.insertText(msg.concatArgs(), pos);
     break;

default:
     return ProcessMsg((TextComponent)textarea, command, msg);
   }
   return true;
} // end ProcessMsg()

/*************************************************************
**
** ProcessMsg(textcomponent,command, msg)
**
*************************************************************/
boolean ProcessMsg(TextComponent textcomponent, int command, S_Expr msg)
{
   Tracer.trace("ProcessMsg", Guiscript.getCmdStr(command) + " " +
msg.toString(1024));
   switch (command)
   {
     case Guiscript.CLEAR:
     textcomponent.setText("");
     break;

case Guiscript.SET_EDITABLE:
     String editable = msg.getFirst();
     textcomponent.setEditable(editable.equals("true"));
     break;

case Guiscript.SET_TEXT: case Guiscript.SET_VALUE:
     if (textcomponent instanceof TextField)
       textcomponent.setText(msg.concatArgs());
     else if (textcomponent instanceof TextArea)
     {
       textcomponent.setText("");
       ((TextArea)textcomponent).appendText(msg.concatArgs());
     }
```

```
      break;

case Guiscript.WRAP_TEXT:
      if (textcomponent instanceof TextField)
        textcomponent.setText(msg.concatArgs());
      else if (textcomponent instanceof TextArea)
        wrapText((TextArea)textcomponent, msg.concatArgs());
      break;

default:
      return ProcessMsg((Component)textcomponent, command, msg);
  }
  return true;
} // end ProcessMsg()

/****************************************************************************
**
** wrapText(textarea, text)
**
****************************************************************************/
public static void wrapText(TextArea textarea, String text)
{
  int columns = textarea.getColumns();
  Tracer.trace("wrapText", "columns = " + columns + "; text =\n[" + text + "]");
  int filledCols = 0;
  StringTokenizer st = new StringTokenizer(text, " \t\n\r", true);
  String token;
  int tlen;

textarea.setText("");
  while (st.hasMoreTokens())
  {
    token = st.nextToken();
    if (token.equals("\n") || token.equals("\r"))
      token = " ";
    tlen = token.length();
    if (tlen + filledCols < columns)
    {
    textarea.appendText(token);
    filledCols += tlen;
    }
    else
    {
    if (token.equals("\t") || token.equals(" "))
    {
      token = "";
      tlen = 0;
    }
    textarea.appendText("\n" + token);
    filledCols = tlen;
    }
  }
} // end wrapText()
```

```
/************************************************************
**
** ProcessMsg(textfield, command, msg)
**
************************************************************/
boolean ProcessMsg(TextField textfield, int command, S_Expr msg)
{
   Tracer.trace("ProcessMsg", Guiscript.getCmdStr(command) + " " +
msg.toString(1024));
   switch (command)
   {
     case Guiscript.SET_ECHO_CHARACTER:
     String echochar = msg.getFirst();
     textfield.setEchoCharacter(echochar.charAt(0));
     break;

default:
     return ProcessMsg((TextComponent)textfield, command, msg);
   }
   return true;
} // end ProcessMsg()

/************************************************************
**
** ProcessMsg(window, command, args)
**
************************************************************/
boolean ProcessMsg(Window window, int command, S_Expr msg)
{
   Tracer.trace("ProcessMsg", Guiscript.getCmdStr(command) + " " +
msg.toString(1024));
   Toolkit toolkit = Toolkit.getDefaultToolkit();

switch (command)
   {
     case Guiscript.DISPOSE:
     window.dispose();
     break;

case Guiscript.HIDE_TRACER:
     Tracer.Hide();
     break;

case Guiscript.PACK:
     window.pack();
     break;

case Guiscript.SHOW:
     window.show();
     break;

case Guiscript.SHOW_TRACER:
     Tracer.Show();
     break;
```

```
    case Guiscript.SHOW_AT:
    int x = msg.getint();
    int y = msg.getint();
    window.move(x, y);
    window.show();
    break;

case Guiscript.TO_BACK:
    window.toBack();
    break;

case Guiscript.TO_FRONT:
    window.toFront();
    break;

default:
    return ProcessMsg((Container)window, command, msg);
    }
    return true;
  } // end ProcessMsg()
} // end class ClientInterpreter
```

What is claimed is:

1. A method for operating a computer system having first through third computers interconnected to one another by a communications channel, said method comprising steps for:

(a) storing a document written in hypertext markup language (HTML), said HTML document including an applet tag for invoking a Universal Client device and computer readable first instructions for generating said Universal Client device, on the first computer;

(b) transmitting said HTML document and said first instructions for generating said Universal Client device from the first computer to the second computer via the communications channel;

(c) storing computer readable second instructions for permitting the second computer to utilize a World Wide Web browser providing a JAVA™ virtual machine;

(d) initializing and executing said Universal Client device on said second computer using said JAVA™ virtual machine to thereby generate predetermined graphical user interface (GUI) objects and display said GUI objects on said second computer;

(e) storing computer readable third instructions on the third computer for controlling the third computer during generation of a character string;

(f) processing said third instructions to thereby generate said string;

(g) transmitting said string to said second computer; and (h) modifying at least one of said GUI objects displayed on the second computer responsive to said string.

2. The operating method for the computer system as recited in claim 1, wherein:

said method further comprises the step for:

(I) storing a script defining one of said predetermined GUI objects on said second computer; and said Universal Client device generates said one of said predetermined GUI objects responsive to said script during said step (d).

3. The operating method for the computer system as recited in claim 1, wherein:

said method further comprises the step for:

(j) storing a script defining at least one of said predetermined GUI objects on said first computer; and said Universal Client device generates said predetermined GUI objects responsive to said script during said step (d).

4. The operating method for the computer system as recited in claim 1, wherein said first instructions include commands to said Universal Client device to establish a predetermined connection between said second computer and said third computer, said predetermined connection being defined in said first instructions.

5. The operating method for the computer system as recited in claim 1, wherein:

said HTML document includes a parameter statement which commands said Universal Client device to establish a predetermined connection between said second computer and said third computer, said predetermined connection being defined in said parameter statement; and said Universal Client device modifies said predetermined GUI objects responsive to said string during said step (h).

6. The operating method for the computer system as recited in claim 5, wherein:

said string comprises a GUIScript message; and during said step (h), said Universal Client device running on said second computer selectively modifies and replaces said predetermined GUI objects responsive to an incoming GUIScript message corresponding to changing parameters associated with said third computer.

7. The operating method for the computer system as recited in claim 5, wherein:

said string comprises a datagram; and during said step (h), said Universal Client device running on said second computer selectively modifies and replaces said predetermined GUI objects responsive to an incoming datagram corresponding to changing parameters associated with said third computer.

8. The operating method for the computer system as recited in claim 5, wherein said third computer comprises N third computers, where N is an integer greater than 1, and wherein said method comprises:

(e) storing N sets of computer readable third instructions on each of N third computers for controlling said N third computers during generation of N character strings, respectively; and (f) processing said N sets of third instructions to thereby generate said N character strings;

(g) transmitting said N character strings to said second computer; and (h) modifying said GUI objects displayed on the second computer responsive to said N character strings.

9. The operating method for the computer system as recited in claim 1, wherein said third computer comprises N third computers, where N is an integer greater than 1, and wherein said method comprises:

(e) storing N sets of computer readable third instructions on each of N third computers for s controlling said N third computers during generation of N character strings, respectively; and (f) processing said N sets of third instructions to thereby generate said N character strings;

(g) transmitting said N character strings to said second computer; and (h) modifying said GUI objects displayed on the second computer responsive to said N character strings.

10. The operating method for the computer system as recited in claim 1, wherein one of said predetermined GUI objects comprises a MultiMedia presentation.

11. The operating method for the computer system as recited in claim 1, wherein one of said predetermined GUI objects comprises a duration timer.

12. An operating method for a computer system having first, second and third computers generating a graphical user interface (GUI) on the first computer screen corresponding to a presentation generated with respect to the second computer screen irrespective of the operating system differences between the respective first, second and third computers, comprising steps for:

providing a hypertext markup language (HTML) document including an applet tag corresponding to a Universal Client device from the third computer to the first computer;

initializing and executing the Universal Client device using a JAVA™ virtual machine associated with the first computer;

for parsing and interpreting a script associated with the Universal Client device to thereby cause the Universal Client device to display the GUI;

parsing and interpreting the script associated with the Universal Client device to thereby cause the Universal Client device to establish a predetermined connection between the first and the second computers; and generating a string causing changes in the GUI displayed by the Universal Client device on the first computer.

13. The operating method for the computer system as recited in claim 12, wherein said predetermined connection comprises a Transmission Control Protocol/Internet Protocol (TCP/IP) connection.

14. The operating method for the computer system as recited in claim 12, wherein said GUI includes a plurality of GUI objects.

15. The operating method for the computer system as recited in claim 14, wherein one of said GUI objects comprises a MultiMedia object.

16. The operating method for the computer system as recited in claim 14, wherein one of said GUI objects comprises a performance assessment object.

17. The operating method for the computer system as recited in claim 12, wherein said string comprises an ASCII character string.

18. The operating method for the computer system as recited in claim 12, wherein said string comprises a datagram.

19. The computer system as recited in claim 12, wherein said string comprises a GUIScript message.

20. An operating method for a computer system generating a representative graphical user interface (GUI) on a first computer screen corresponding to a presentation generated with respect to a second computer screen irrespective of the operating system differences between the respective first and second computers and a third computer, comprising steps for:

providing a hypertext markup language (HTML) document including an applet tag corresponding to a Universal Client device and a first script defining a first GUI;

initializing and executing the Universal Client device responsive to said first script using a JAVA™ virtual machine;

parsing and interpreting said first script to thereby cause the Universal Client device to display the first GUI;

parsing and interpreting the first script to thereby cause the Universal Client device to establish a predetermined connection between the first and the third computers and to generate a second script permitting the Universal Client device to control said second computer;

parsing and interpreting said second script, for generating a first instruction to which said second computer responds;

receiving said first instruction for generating a second instruction representing the presentation displayed on the second computer screen;

receiving said second instruction for generating a third script; and receiving said third script for causing said Universal Client device to replace said first GUI with said representative GUI on said first computer screen.

21. The operating method for the computer system as recited in claim 20, wherein said predetermined connection comprises a Transmission Control Protocol/Internet Protocol (TCP/IP) connection.

22. The operating method for the computer system as recited in claim 20, wherein each of said first GUI and said representative GUI includes a plurality of GUI objects.

23. The operating method for the computer system as recited in claim 22, wherein one of said GUI objects comprises a MultiMedia object.

24. The operating method for the computer system as recited in claim 22, wherein one of said GUI objects comprises a performance assessment object.

25. A method for operating a computer system generating a representative graphical user interface (GUI) on a first computer screen corresponding to a presentation generated with respect to a second computer screen irrespective of the operating system differences between the respective first and second computers and a third computer, the method comprising steps for:

providing a hypertext markup language (HTML) document including an applet tag corresponding to a Universal Client device and a first script defining a first GUI;

initializing and executing the Universal Client device responsive to said first script using a JAVA™ virtual machine;

parsing and interpreting said first script to thereby cause the Universal Client device to display the first GUI;

parsing and interpreting the first script to thereby cause the Universal Client device to establish a predetermined connection between the first and the third computers and to generate a second script permitting the Universal Client device to control said second computer;

parsing and interpreting said second script, for generating a first instruction to which said second computer responds;

generating a second instruction representing the presentation displayed on the second computer screen responsive to said first instruction;

generating a third script responsive to said second instruction; and causing said Universal Client device to replace said first GUI with said representative GUI on said first computer screen responsive to said third script.

26. The method as recited in claim 25, wherein said predetermined connection comprises a Transmission Control Protocol/Internet Protocol (TCP/IP) connection.

27. The method as recited in claim 25, wherein each of said first GUI and said representative GUI includes a plurality of GUI objects.

28. The method as recited in claim 27, wherein one of said GUI objects comprises a MultiMedia object.

29. The method as recited in claim 27, wherein one of said GUI objects comprises a performance assessment object.

* * * * *